United States Patent
Schlenoff

(10) Patent No.: US 10,253,203 B2
(45) Date of Patent: Apr. 9, 2019

(54) ROUGH POLYELECTROLYTE COMPLEX COATINGS AND METHODS OF FORMING

(71) Applicant: The Florida State University Research Foundation, Inc., Tallahassee, FL (US)

(72) Inventor: Joseph B. Schlenoff, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 99 days.

(21) Appl. No.: 15/115,985

(22) PCT Filed: Feb. 2, 2015

(86) PCT No.: PCT/US2015/014104
§ 371 (c)(1),
(2) Date: Aug. 2, 2016

(87) PCT Pub. No.: WO2015/119891
PCT Pub. Date: Aug. 13, 2015

(65) Prior Publication Data
US 2017/0204287 A1    Jul. 20, 2017

Related U.S. Application Data

(60) Provisional application No. 61/935,522, filed on Feb. 4, 2014.

(51) Int. Cl.
*B32B 27/00* (2006.01)
*C09D 147/00* (2006.01)
*C09D 201/02* (2006.01)
*B01J 41/14* (2006.01)
*B05D 3/00* (2006.01)
(Continued)

(52) U.S. Cl.
CPC ............ *C09D 147/00* (2013.01); *B01J 41/14* (2013.01); *B05D 3/007* (2013.01); *B05D 5/02* (2013.01); *C09D 5/1662* (2013.01); *C09D 5/1681* (2013.01); *C09D 125/18* (2013.01); *C09D 201/02* (2013.01)

(58) Field of Classification Search
None
See application file for complete search history.

(56) References Cited

U.S. PATENT DOCUMENTS

| | | | |
|---|---|---|---|
| 3,276,598 | A | 10/1966 | Michaels et al. |
| 3,546,142 | A | 12/1970 | Michaels et al. |

(Continued)

FOREIGN PATENT DOCUMENTS

| | | |
|---|---|---|
| WO | 2007056427 A2 | 5/2007 |
| WO | 2008027989 A2 | 3/2008 |

OTHER PUBLICATIONS

Allen, Norman S., "Polymer Photochemistry", Photochemistry, 2007, vol. 36, pp. 232-297.
(Continued)

*Primary Examiner* — Cachet I Sellman
(74) *Attorney, Agent, or Firm* — Armstrong Teasdale LLP

(57) ABSTRACT

Articles are provided comprising a substrate and a coating. The coating comprises a polyelectrolyte complex having surface roughness. The polyelectrolyte complex has a thickness of at least 10 micrometers and a roughness of at least 1 micrometer.

8 Claims, 8 Drawing Sheets

(51) Int. Cl.
*B05D 5/02* (2006.01)
*C09D 5/16* (2006.01)
*C09D 125/18* (2006.01)

(56) References Cited

U.S. PATENT DOCUMENTS

| | | | |
|---|---|---|---|
| 3,558,744 | A | 1/1971 | Michaels et al. |
| 3,565,973 | A | 2/1971 | Michaels |
| 4,539,373 | A | 9/1985 | Mani et al. |
| 6,660,367 | B1 | 12/2003 | Yang et al. |
| 6,905,875 | B2 | 6/2005 | Yu et al. |
| 7,101,947 | B2 | 9/2006 | Schlenoff et al. |
| 7,105,229 | B2 | 9/2006 | Anderson |
| 7,223,327 | B2 | 5/2007 | Schlenoff et al. |
| 7,238,536 | B1 | 7/2007 | Schlenoff |
| 7,387,824 | B2 | 6/2008 | Tamagawa et al. |
| 9,005,662 | B2 * | 4/2015 | Schlenoff ............... A61L 15/42 424/484 |
| 2003/0003272 | A1 * | 1/2003 | Laguitton ............. B05D 1/185 428/141 |
| 2004/0044100 | A1 * | 3/2004 | Schlenoff ............... C07B 57/00 523/206 |
| 2004/0111139 | A1 * | 6/2004 | McCreery ............ A61N 1/0556 607/117 |
| 2004/0265603 | A1 | 12/2004 | Schlenoff |
| 2005/0153643 | A1 | 7/2005 | Simpson et al. |
| 2005/0176620 | A1 | 8/2005 | Prestwich et al. |
| 2005/0282925 | A1 | 12/2005 | Schlenoff et al. |
| 2005/0287111 | A1 | 12/2005 | Schlenoff et al. |
| 2006/0007333 | A1 | 1/2006 | Horii |
| 2006/0029808 | A1 * | 2/2006 | Zhai ........................ B05D 5/04 428/412 |
| 2006/0051532 | A1 | 3/2006 | Tamagawa et al. |
| 2006/0065529 | A1 | 3/2006 | Schlenoff et al. |
| 2007/0243237 | A1 | 10/2007 | Khaled et al. |
| 2007/0259452 | A1 | 11/2007 | Schlenoff |
| 2007/0265174 | A1 * | 11/2007 | Schlenoff ............... B82Y 30/00 508/106 |
| 2008/0268229 | A1 * | 10/2008 | Lee ....................... C03C 17/001 428/323 |
| 2010/0003499 | A1 * | 1/2010 | Krogman ........... B01D 67/0088 428/323 |
| 2012/0094020 | A1 | 4/2012 | Schlenoff |
| 2012/0148522 | A1 * | 6/2012 | Schlenoff ............... A61L 15/42 424/78.35 |
| 2012/0315461 | A1 * | 12/2012 | Mehrabi ..................... C08J 9/26 428/306.6 |
| 2015/0143611 | A1 * | 5/2015 | Megat Abdul Aziz .... C08J 9/36 2/167 |
| 2015/0240045 | A1 * | 8/2015 | Iliuta ..................... B01D 67/002 96/6 |

OTHER PUBLICATIONS

Biggerstaff et al., "Damping Performance of Cocured Graphite/Epoxy Composite Laminates with Embedded Damping Materials", Journal of Composite Materials, 1999, vol. 33, No. 15, pp. 1457-1469.

Dai et al., "Controlling the Permeability of Multilayered Polyelectrolyte Films through Derivatization, Cross-Linking, and Hydrolysis", Langmuir, 2001, vol. 17, No. 3, pp. 931-937.
Dubas et al., "Swelling and Smoothing of Polyelectrolyte Multilayers by Salt", Langmuir, 2001, vol. 17,pp. 7725-7727.
Graul et al., "Capillaries Modified by Polyelectrolyte Multilayers for Electrophoretic Separations", Analytical Chemistry, 1999, vol. 71, No. 18, pp. 4007-4013.
Holmlin et al., "Zwitterionic SAMs that Resist Nonspecific Adsorption of Protein from Aqueous Buffer", Langmuir, 2001, vol. 17, No. 9, pp. 2841-2850.
Iatridis et al., "The Viscoelastic Behavior of the Non-Degenerate Human Lumbar Nucleus Pulposus in Shear", J. Biomechanics, 1997, vol. 30, No. 10, pp. 1005-1013.
Iatridis et al., "Shear Mechanical Properties of Human Lumbar Annulus Fibrosus", Journal of Orthopaedic Research, 1999, vol. 17, No. 5, pp. 732-737.
Jaber et al., "Mechanical Properties of Reversibly Cross-Linked Ultrathin Polyelectrolyte Complexes", Journal of American Chemical Society, 2006, vol. 128, pp. 2940-2947.
Kozlovskaya et al., "Hydrogen-Bonded Polymer Capsules Formed by Layer-by-Layer Self-Assembly", Macromolecules, 2003, vol. 36, pp. 8590-8592.
Lim et al., "Microencapsulated Islets as Bioartificial Endocrine Pancreas", Science, New Series, 1980, vol. 210, No. 4472, pp. 908-910.
Losche et al., "Detailed Structure of Molecularly Thin Polyelectrolyte Multilayer Films on Solid Substrates as Revealed by Neutron Reflectometry", Macromolecules, 1998, vol. 31, No. 25, pp. 8893-8906.
Michaels, Alan S., "Polyelectrolyte Complexes", Industrial & Engineering Chemistry, 1965, vol. 57, No. 10, pp. 32-40.
Rosidian et al., "Ionic Self-Assembly of Ultrahard ZrO2/Polymer Nanocomposite Thin Films", Advanced Materials, 1998, vol. 10, No. 14, pp. 1087-1091.
Smets, G., "Photocross-Linkable Polymers", Journal of Macromolecular Science Chemistry, 1984, A21(13 & 14), pp. 1695-1703.
Strehmel, Veronika, "Epoxies: Structures, Photoinduced Cross-Linking, Network Properties, and Applications", Handbook of Photochemistry and Photobiology, 2003, Chapter 1, pp. 1-110.
Sui et al., "Phase Separations in pH-Responsive Polyelectrolyte Multilayers: Charge Extrusion versus Charge Expulsion", Langmuir, 2004, vol. 20, No. 14, pp. 6026-6031.
Timpe, Hans-Joachim, "Polymer Photochemistry and Photo-Cross-Linking", Desk Reference of Functional Polymers: Syntheses and Applications, 1997, pp. 273-291.
Poly(Ethylene Glycol) Chemistry: Biotechnical and Biomedical Applications (Table of Contents only), Edited by Milton J. Harris, 1992, Plenum Press, New York, New York, 13 pages.
R. Reese Handbook of Antibiotics (Table of Contents and Preface only), Third Edition, 2000, 3 pages, Lippincott Williams and Wilkins, Philadelphia, Pennsylvania.
International Search Report, PCT/US2007/77146, dated Mar. 7, 2008, 2 pages.
Written Opinion of the International Searching Authority, PCT/US2007/77146, dated Mar. 7, 2008, 8 pages.
International Search Report and Written Opinion of the International Searching Authority regarding US/PCT2015/014104 dated May 12, 2015; 12 pages.

* cited by examiner

ROUGH POLYELECTROLYTE COMPLEX COATINGS AND METHODS OF FORMING

CROSS REFERENCE TO RELATED APPLICATIONS

This application is a U.S. national stage application based on International Application No. PCT/US2015/014104, which was filed Feb. 2, 2015 and has published as International Publication No. WO 2015/119891 A1. International Application No. PCT/US2015/014104 claims priority to U.S. Provisional Application Ser. No. 61/935,522, which was filed Feb. 4, 2014. Both priority applications are hereby incorporated by reference as if set forth in their entirety.

STATEMENT REGARDING FEDERALLY SPONSORED RESEARCH OR DEVELOPMENT

This invention was made with Government support under Grants awarded by the National Science Foundation grant DMR 1207188. The Government has certain rights in the invention.

FIELD OF THE INVENTION

The present invention relates to surface roughness in polyelectrolyte complexes applied as a coating, and methods of forming said rough coatings.

BACKGROUND OF THE INVENTION

Hydrogels comprise water and polymers and are useful for medical and pharmaceutical applications (e.g., see Peppas, N. A.; Editor, *Hydrogels in Medicine and Pharmacy, Vol. 3: Properties and Applications*. 1987; p 195 pp.). Hydrogels are usually held together via physical or chemical crosslinks. Otherwise, the polymers of which they are comprised would dissolve in the solvent (e.g., water). Polyelectrolyte complexes are interpenetrating complexes of one or more predominantly positive polyelectrolytes and one or more predominantly negative polyelectrolytes. The opposite charges on the polymers form ion pairs between chains, holding the chains together. This ion pairing is a type of physical crosslinking. Polyelectrolyte complexes in contact with aqueous solutions can be considered hydrogels with high crosslinking density.

Polyelectrolyte complexes are prepared in a straightforward manner by mixing solutions of positive and negative polyelectrolytes. However, the resulting precipitate is gelatinous and difficult to process. The dried complexes, for example, are generally infusible and therefore cannot be injection molded or reformed into articles under elevated temperatures. Michaels (U.S. Pat. No. 3,324,068) has disclosed the use of non-volatile plasticizers such as nonvolatile acids, organic oxysulfur compounds, and organic oxyphosphorous compounds to decrease the brittleness of polyelectrolyte complexes when they are dried. U.S. Pat. No. 3,546,142 describes a method for creating solutions of polyelectrolyte complexes using aggressive ternary solvents which are mixtures of salt, water, and organic solvent. Said solutions of dissolved complexes may be cast into films by evaporating the solvent on horizontal plates. Mani et al. (U.S. Pat. No. 4,539,373) point out that the solid polyelectrolyte complexes "are not thermoplastic, i.e. they are not moldable or extrudable, so they must be handled as solutions." Mani et al. disclose a polyelectrolyte complex comprising nonionic thermoplastic repeat units which can be thermally molded.

U.S. Pat. Nos. 8,114,918; 8,222,306; 8,283,030; 8,314,158; and 8,372,891 and U.S. Pat. Pub. No. 20090162640 which are incorporated fully by reference, disclose how fully hydrated (i.e., complexes in contact with water) polyelectrolyte complexes may be reformed into shapes without raising the temperature, without the addition of organic solvent, and without the need for dissolution, if they are doped with salt ions to a sufficient extent.

An alternative method for producing ultrathin films (less than about 1 micrometer thick) of polyelectrolyte complex is the multilayering method described by Decher in U.S. Pat. No. 5,208,111, wherein a surface is exposed in an alternating fashion to solutions of positive and negative polyelectrolytes. The resulting films are uniform and conformal, though ultrathin. The process, however, can be unacceptably slow, especially if numerous layers of polyelectrolyte are needed. As with any surface, roughness exists on the surface of these polyelectrolyte multilayer films, but the roughness is on the nanometer scale, typically in the range of 1-10 nm. Roughness exceeding the nm scale is considered undesirable, and may be minimized, for example by annealing the ultrathin film in salt solutions, as described in *Langmuir*, 17, 7725 (2001).

Regardless of the method of producing polyelectrolyte complex, for certain applications, there is a need to produce surface roughness in a finished product. Surface roughness of articles in contact with liquid can be advantageous in decreasing the viscous drag on said article. A well-known example is the surface of a shark skin, which is naturally rough. An additional benefit is that the turbulence at a micro-rough surface is thought also to decrease fouling or adhesion. The dual benefits of reduced drag and enhanced anti-fouling have motivated much research. U.S. Pat. No. 5,386,955 describes attempts to produce roughness in surfaces to mimic the shark skin. Roughness, or even a geometric pattern, can be embossed into a surface, as in U.S. Pat. No. 5,386,955, or the surface can simply be abraded. A coating method that spontaneously produces a rough surface on application would represent a significant advantage.

SUMMARY OF THE INVENTION

Among the various aspects of the present invention may be noted persistent surface roughness on coating comprising an interpenetrating network of at least one predominantly positively charged polyelectrolyte and at least one predominantly negatively charged positive polyelectrolyte. The surface roughness is at least 1 micrometer and is integral to the polyelectrolyte complex.

The profile of said roughness is undulating, with no sharp edges or asperities or grooves as would be caused by abrasion of the surface (e.g., with sandpaper). The method of forming the coating determines directly the contours of the roughness.

Briefly, the present invention is directed to a coating comprising a polyelectrolyte complex, the polyelectrolyte complex comprising an interpenetrating blend of a positively charged polyelectrolyte and a negatively charged polyelectrolyte, the polyelectrolyte complex having a thickness of at least 10 micrometers and a surface roughness of at least 1 about micrometer.

The present invention is further directed to an article comprising: a substrate; and a coating comprising a polyelectrolyte complex, the polyelectrolyte complex comprising an interpenetrating blend of a positively charged polyelectrolyte and a negatively charged polyelectrolyte, the polyelectrolyte complex having a thickness of at least 10 micrometers and a surface roughness of at least 1 micrometer.

The present invention is still further directed to a process for preparing an article, the process comprising: depositing a polyelectrolyte complex dope on a substrate, wherein the polyelectrolyte complex dope comprises an interpenetrating blend of a positively charged polyelectrolyte and a negatively charged polyelectrolyte, and a salt and has a thickness of at least about 10 micrometers; and rinsing the polyelectrolyte complex dope with an aqueous solution to remove the salt and thereby form a polyelectrolyte complex coating having a surface roughness of at least 1 about micrometer.

Other objects and features will be in part apparent and in part pointed out hereinafter.

DESCRIPTION OF THE EMBODIMENT(S) OF THE INVENTION

Figure 1:
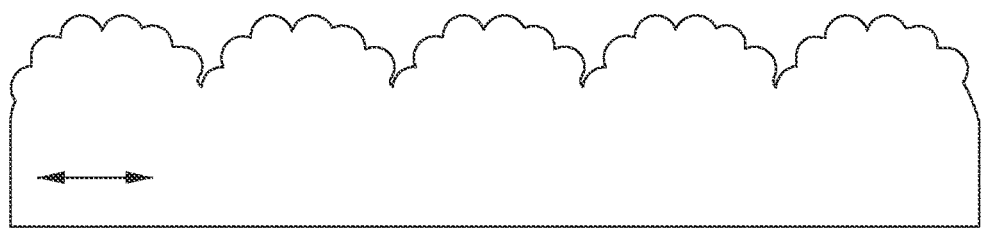
FIG. 1 is an illustration of a polyelectrolyte complex having roughness according to the present invention.

One aspect of the invention is a coating comprising a polymer, in particular, a polymer known as a "polyelectrolyte" that comprises multiple electrolytic repeat units that dissociate in solutions, making the polymer charged. The coating of the present invention comprises a polyelectrolyte complex. A polyelectrolyte complex comprises an intermolecular blend of a predominantly positively-charged polyelectrolyte and a predominantly negatively-charged polyelectrolyte. The polyelectrolyte complex coating is preferably continuous and contains less than 10 volume % bulk pores, preferably less than 5 volume % bulk pores, such as less than 1 volume % bulk pores. In some embodiments, the polyelectrolyte complex coating is preferably continuous and contains no bulk pores. A bulk pore is a void under the surface that does not break the surface. The coating may be deposited on a material as a film having a thickness greater than about ten micrometers, which is substantially greater than that typically achieved by conventional multilayering (as described for example in *Science*, 277 p 1232-1237 (1997)).

Previous disclosures (e.g., U.S. Pat. Nos. 8,114,918; 8,222,306; 8,283,030; 8,314,158; and 8,372,891) demonstrate that increasing the salt concentration within the bulk of the fully hydrated polyelectrolyte complex, by contacting it with a sufficiently high concentration of salt, renders the complex flowable without resorting to a change in temperature or other conditions. Under such force-flowable conditions the complex may be reshaped into a second persistent shape by applying a force. Said shape persists in solutions of salt. Conversely, decreasing the salt concentration with the bulk of the polyelectrolyte complex is believed to cause the complex to revert to a non-flowable state. Advantageously, the transformation of the complex into a force-flowable material takes place without recourse to elevated temperatures and without the requirement for organic solvents or acids or organic plasticizers. Accordingly, the dynamic mechanical properties of an article comprising the polyelectrolyte complex may be initially controlled by controlling the salt concentration during the preparation of the polyelectrolyte complex and then altered by increasing or decreasing the salt concentration of the solution contacting the article after preparation. Thus, for example, a flowable article may be prepared in the presence of high salt concentration, and then injected into a mold. Once the flowable article is in the mold, or has been removed from the mold, a concentration gradient may be applied by contacting the reshaped article with a solution having a lower salt concentration, which thereby causes salt located in the bulk of the article to diffuse out into the solution, making the article less flowable, thereby causing an increase in the modulus of the article, which is defined by the inner surfaces of the mold.

In general, the polyelectrolyte complex is formed by combining a predominantly negatively charged polyelectrolyte and a predominantly positively charged polyelectrolyte. In a preferred embodiment, the formation of the article starts with combining separate solutions, each containing one of the polyelectrolytes. In one embodiment, at least one solution comprises at least one predominantly positively-charged polyelectrolyte, and at least one solution comprises at least one predominantly negatively-charged polyelectrolyte. The formation of a polyelectrolyte complex, Pol⁺Pol⁻, by mixing individual solutions of the polyelectrolytes in their respective salt forms, Pol⁺A⁻ and Pol⁻M⁺, may be represented by the following equation (1):

$$Pol^+A^- + Pol^-M^+ \rightarrow Pol^+Pol^- + MA \qquad (1)$$

where M⁺ is a salt cation, such as sodium, and A⁻ is a salt anion such as chloride. Pol⁻ and Pol⁺ represent repeat units on predominantly negatively charged and predominantly positively charged polyelectrolytes, respectively. According to the equation, the process of complexation releases salt ions into external solution, which are then part of the salt solution concentration.

The precipitates of polyelectrolyte complex, Pol$^+$Pol$^-$, formed by the reaction above are usually loose with much entrained water. The precipitates may be allowed to densify or consolidate further by sitting for a period of time, or being mechanically worked. The material that is eventually used for preparing the coating material is termed the "starting polyelectrolyte complex."

Separate solutions containing the polyelectrolytes are preferably combined in a manner that allows the positively-charged polyelectrolyte(s) and the negatively-charged polyelectrolyte(s) to intermix. Intermixing the respective polyelectrolytes causes the in situ formation of a polyelectrolyte complex comprising an intermolecular blend of the positively-charged polyelectrolyte and the negatively-charged polyelectrolyte.

Individual polyelectrolyte solutions that are mixed may themselves comprise mixtures of polyelectrolytes of different chemical composition and/or molecular weight. For example, a solution may comprise two positive polyelectrolytes with two distinct chemical compositions. When the mixture of positive polyelectrolytes is mixed with the negative polyelectrolyte solutions the resulting complex will incorporate a blend of the two positive polyelectrolytes. Such a strategy is described for example in U.S. Pat. No. 7,722,752.

The disclosures of U.S. Pat. Nos. 8,114,918; 8,222,306; 8,283,030; 8,314,158; and 8,372,891 describe and require that salt ions be present in the polyelectrolyte complex to render it sufficiently flowable for deformation and processing, e.g., by extrusion through an orifice. Salt breaks the intermolecular ion pairing between polymers, allowing it to flow under a mechanical force.

Polyelectrolyte complexes that are not doped with salt are at their maximum crosslink density, i.e., at the maximum density of ion pair formation, which endows them with their highest modulus. In some embodiments, polyelectrolyte complexes that are not doped with salt are endowed with their highest modulus, whether measured as the elastic modulus, the Young's modulus, the shear modulus, and/or the bulk modulus.

The starting polyelectrolyte complex is preferably prepared by mixing approximately stoichiometric amounts of positive and negative polyelectrolytes. In other words, the total number of positive polyelectrolyte charges within the starting polyelectrolyte complex is approximately equal to the total number of negative polyelectrolyte charges. The starting polyelectrolyte complex can be slightly non-stoichiometric, but preferably the ratio of total positive to negative charges in the starting polyelectrolyte complex is between 0.8 and 1.2, where a ratio of 1.0 is exactly stoichiometric.

In some embodiments, the rough polyelectrolyte complex of the invention is a coating over an article. The rough polyelectrolyte complex coating of the present invention comprises a bulk region, an inner surface, and an outer surface. The inner surface is the surface in contact with the article, while the outer surface is opposite that of the inner surface. The outer surface of the polyelectrolyte complex may be roughened, according to the method of the present invention. The bulk region of the polyelectrolyte complex comprising the material between the inner surface and the outer surface. In the final coating, the bulk properties, such as modulus, toughness, and stability, are preferably optimized. Properties, such as adhesion and stability, of the inner surface, which is not exposed to solution but is in contact with an article, are optimized. Properties of the outer surface, such as roughness, scratch resistance and toughness/durability and chemical composition, are preferably optimized.

I. Polyelectrolytes for Complexes

The charged polymers (i.e., polyelectrolytes) used to form the complexes are water and/or organic soluble and comprise one or more monomer repeat units that are positively or negatively charged. The polyelectrolytes used in the present invention may be copolymers that have a combination of charged and/or neutral monomers (e.g., positive and neutral; negative and neutral; positive and negative; or positive, negative, and neutral). Regardless of the exact combination of charged and neutral monomers, a polyelectrolyte of the present invention is predominantly positively charged or predominantly negatively charged and hereinafter is referred to as a "positively charged polyelectrolyte" or a "negatively charged polyelectrolyte," respectively.

Alternatively, the polyelectrolytes can be described in terms of the average charge per repeat unit in a polymer chain. For example, a copolymer composed of 100 neutral and 300 positively charged repeat units has an average charge of 0.75 (3 out of 4 units, on average, are positively charged). As another example, a polymer that has 100 neutral, 100 negatively charged, and 300 positively charged repeat units would have an average charge of 0.4 (100 negatively charged units cancel 100 positively charged units leaving 200 positively charged units out of a total of 500 units). Thus, a positively-charged polyelectrolyte has an average charge per repeat unit between 0 and 1 and a negatively-charged polyelectrolyte has an average charge per repeat unit between 0 and −1. An example of a positively-charged copolymer is PDADMA-co-PAC (i.e., poly (diallyldimethylammonium chloride) and polyacrylamide copolymer) in which the PDADMA units have a charge of 1 and the PAC units are neutral so the average charge per repeat unit is less than 1.

Some polyelectrolytes comprise equal numbers of positive repeat units and negative repeat units distributed throughout the polymer in a random, alternating, or block sequence. These polyelectrolytes are termed "amphiphilic" polyelectrolytes. For examples, a polyelectrolyte molecule may comprise 100 randomly distributed styrene sulfonate repeat units (negative) and 100 diallyldimethylammonium chloride repeat units (positive), said molecule having a net charge of zero. If charges on one amphiphilic polymer associate with charges on another the material is considered a polyelectrolyte complex.

Some polyelectrolytes comprise a repeat unit that has both a negative and positive charge. Such repeat units are termed "zwitterionic" and the polyelectrolyte is termed a "zwitterionic polyelectrolyte." Though zwitterionic repeat units contribute equal number of positive and negative repeat units, the zwitterionic group is still solvated and relatively hydrophilic.

Since the role of zwitterions groups is to reduce fouling of a polyelectrolyte complex, the location of the zwitterion groups within a polyelectrolyte coating is preferably at the outer surface.

The charges on a polyelectrolyte may be derived directly from the monomer units, or they may be introduced by chemical reactions on a precursor polymer. For example, PDADMA is made by polymerizing diallyldimethylammonium chloride, a positively charged water soluble vinyl monomer. PDADMA-co-PAC is made by the polymerization of a mixture of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and typically result in an average charge per repeat unit that is less than 1. For example, if only about 80% of the styrene repeat units of polystyrene are sulfonated, the resulting poly(styrenesulfonic acid) has an average charge per repeat unit of about −0.8.

Examples of a negatively-charged synthetic polyelectrolyte include polyelectrolytes comprising a sulfonate group (—SO$_3^-$), such as poly(styrenesulfonic acid) (PSS), poly(2-acrylamido-2-methyl-1-propane sulfonic acid) (PAMPS), sulfonated poly (ether ether ketone) (SPEEK), poly(ethylenesulfonic acid), poly(methacryloxyethylsulfonic acid), their salts, and copolymers thereof; polycarboxylates such as poly(acrylic acid) (PAA) and poly(methacrylic acid), polyphosphates, and polyphosphonates.

Examples of a positively-charged synthetic polyelectrolyte include polyelectrolytes comprising a quaternary ammonium group, such as poly(diallyldimethylammonium chloride) (PDADMA), poly(vinylbenzyltrimethylammonium) (PVBTA), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly(N-methylvinylpyridinium) (PMVP), including poly(N-methyl-2-vinylpyridinium) (PM2VP), other poly(N-alkylvinylpyridines), and copolymers thereof; protonated polyamines such as poly(allylaminehydrochloride) (PAH), polyvinylamine, polyethyleneimine (PEI); polysulfoniums, and polyphosphoniums.

Exemplary polyelectrolyte repeat units, both positively charged and negatively charged, are shown in Table I.

TABLE I

| Name | Polyelectrolyte Repeat Units Structure |
|---|---|
| diallyldimethylammonium (PDADMA) | 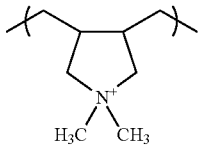 |
| styrenesulfonic acid (PSS) | 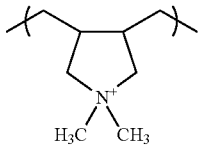 |
| N-methyl-2-vinyl pyridinium (PM2VP) | 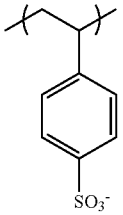 |

TABLE I-continued

| Name | Polyelectrolyte Repeat Units Structure |
|---|---|
| N-methyl-4-vinylpyridinium (PM4VP) | 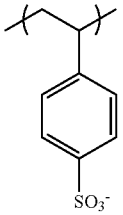 |
| N-octyl-4-vinylpyridinium (PNO4VP) | 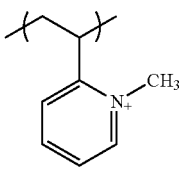 |
| N-methyl-2-vinyl pyridinium-co-ethyleneoxide (PM2VP-co-PEO) | 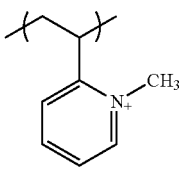 X and Y denote proportions of repeat units |
| acrylic acid (PAA) | 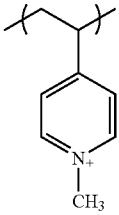 |
| allylamine (PAH) | 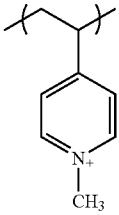 |
| ethyleneimine (PEI) | 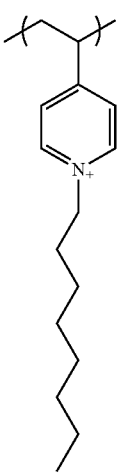 |

Further examples of polyelectrolytes include charged biomacromolecules, which are naturally occurring polyelectrolytes, or synthetically modified charged derivatives of naturally occurring biomacromolecules, such as modified celluloses, chitosan, or guar gum. A positively-charged biomacromolecule usually comprises a protonated sub-unit (e.g., protonated amines). Some negatively charged biomacromolecules comprise a deprotonated sub-unit (e.g., deprotonated carboxylates or phosphates). Examples of biomacromolecules which may be charged for use in accordance with the present invention include proteins, polypeptides, enzymes, DNA, RNA, glycosaminoglycans, alginic acid, chitosan, chitosan sulfate, cellulose sulfate, polysaccharides, dextran sulfate, carrageenin, glycosaminoglycans, sulfonated lignin, and carboxymethylcellulose.

The advantages of these naturally occurring polyelectrolytes are that they may be inexpensive, widely available, and nontoxic. The disadvantages of these naturally occurring polyelectrolytes are that their complexes can be soft and hydrated and they may be degraded or consumed by natural organisms. If the rough polyelectrolyte complex coating is to be used in natural environments any coating consumed or degraded by organisms may encourage undesired attachment and growth of said organisms, in which case synthetic polyelectrolytes are preferred.

Natural, or biological, polyelectrolytes typically exhibit greater complexity in their structure than synthetic polyelectrolytes. For example, proteins may comprise any combination of about 2 dozen amino acid building blocks, some charged, which are natural repeat units. Polymeric nucleic acids such as DNA and RNA may also comprise many different monomer repeat units ("nucleobases"). The sign and magnitude of the charge on proteins depends on the solution pH, as the charge on proteins is carried by weak acids, such as carboxylates (—COOH), or weak bases, such as primary, secondary, and tertiary amines. Thus, at high pH (basic conditions) amines are deprotonated and uncharged, and carboxylate groups are deprotonated and charged. At low pH (acidic conditions) amines are protonated and charged, and carboxylate groups are protonated and uncharged. For proteins, there is a pH at which there are equal numbers of positive and negative charges on the biomolecule, and it is thus electrically neutral. This is termed the isoelectric point, or pI. At pH above the isoelectric point, the protein has a net negative charge and at pH below pI, proteins bear a net positive charge. Proteins that tend to have a preponderance of positive charge at physiological pH, characterized by a high pI, are often termed "basic" proteins, and proteins with a low pI are called "acidic" proteins.

The molecular weight (number average) of synthetic polyelectrolyte molecules is typically about 1,000 to about 5,000,000 grams/mole, preferably about 10,000 to about 1,000,000 grams/mole. The molecular weight of naturally occurring polyelectrolyte molecules (i.e., biomacromolecules), however, can reach as high as 10,000,000 grams/mole. The polyelectrolyte solutions that are mixed to prepare the starting polyelectrolyte complex typically comprise about 0.01% to about 50% by weight of a polyelectrolyte, and preferably about 1% to about 20% by weight.

Many of the foregoing polymers/polyelectrolytes, such as PDADMA and PEI, exhibit some degree of branching. Branching may occur at random or at regular locations along the backbone of the polymer. Branching may also occur from a central point and in such a case the polymer is referred to as a "star" polymer, if generally linear strands of polymer emanate from the central point. If, however, branching continues to propagate away from the central point, the polymer is referred to as a "dendritic" polymer. Branched polyelectrolytes, including star polymers, comb polymers, graft polymers, and dendritic polymers, are also suitable for purposes of this invention. Block polyelectrolytes, wherein a macromolecule comprises at least one block of charged repeat units, are also suitable. The number of blocks may be 2 to 5. Preferably, the number of blocks is 2 or 3. If the number of blocks is 3 the block arrangement is preferably ABA.

Many of the foregoing polyelectrolytes have very low toxicity. For example, poly(diallyldimethylammonium chloride), poly(2-acrylamido-2-methyl-1-propane sulfonic acid) and their copolymers are used in the personal care industry, e.g., in shampoos. Also, because the preferred polyelectrolytes used in the method of the present invention are synthetic or synthetically modified natural polymers, their properties (e.g., charge density, viscosity, water solubility, and response to pH) may be tailored by adjusting their composition.

By definition, a polyelectrolyte solution comprises a solvent. An appropriate solvent is one in which the selected polyelectrolyte is soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely, insoluble in water. Likewise, a hydrophobic polymer is more likely to be soluble in organic solvents than a hydrophilic polymer. In general, the higher the carbon to charge ratio of the polymer, the more hydrophobic it tends to be. For example, polyvinyl pyridine alkylated with a methyl group (PNMVP) is considered to be hydrophilic, whereas polyvinyl pyridine alkylated with an octyl group (PNOVP) is considered to be hydrophobic. Thus, water is preferably used as the solvent for hydrophilic polyelectrolytes and organic solvents such as ethanol, methanol, dimethylformamide, acetonitrile, carbon tetrachloride, and methylene chloride are preferably used for hydrophobic polyelectrolytes. Even if polyelectrolyte complexes are prepared by mixing organic-soluble and water-soluble polymers, the starting polyelectrolyte complex is preferably rinsed to remove organic solvents before it is processed according to the method described herein. Some organic solvents are hard to remove even with extensive rinsing. Therefore, the preferred solvent for polyelectrolyte complexation is water.

Examples of polyelectrolytes that are soluble in water include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids), their salts, and copolymers thereof; as well as poly(diallyldimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridium), and protonated polyamines, such as, poly(allylamine hydrochloride), polyvinylamine and poly(ethyleneimine).

Examples of polyelectrolytes that are soluble in non-aqueous solvents, such as ethanol, methanol, dimethylformamide, acetonitrile, carbon tetrachloride, and methylene chloride include poly(N-alkylvinylpyridines), and copolymers thereof in which the alkyl group is longer than about 4 carbon atoms. Other examples of polyelectrolytes soluble in organic solvents include poly(styrenesulfonates), poly(diallyldimethylammonium), poly(N-alkylvinylpyridinium), poly(alkylimidazoles), poly(vinylbenzylalkylammoniums) and poly(ethyleneimine) where the small inorganic counterion, such as, sodium, potassium, chloride or bromide, has been replaced by a hydrophobic counterion such as tetrabutyl ammonium, tetraethyl ammonium, tetraalkylammonium, alkylammonium, alkylphosphonium, alkylsulfonium, alkylimidazolium, alkylpiperidinium, alkylpyridinium, alkylpyrazolium, alkylpyrrolidinium, iodine, alkylsulfate, arylsulfonates, hexafluorophosphate, tetrafluoroborate, trifluoromethane sulfonate, hexfluorphosphate or bis(trifluoromethane)sulfonimide.

Some polyelectrolytes comprise rigid rod backbones, such as aromatic backbones, or partially aromatic backbones, including sulfonated polyparaphenylene, sulfonated polyetherether ketones (SPEEK), sulfonated polysulfones, sulfonated polyarylenes, sulfonated polyarylene sulfones, and polyarylenes comprising alkylammonium groups.

The charged polyelectrolyte may be a synthetic copolymer comprising pH sensitive repeat units, pH insensitive repeat units, or a combination of pH sensitive repeat units and pH insensitive repeat units. pH insensitive repeat units maintain the same charge over the working pH range of use. The rationale behind such a mixture of pH sensitive groups and pH insensitive groups on the same molecule is that the pH insensitive groups interact with other, oppositely-charged pH insensitive groups on other polymers, holding the multilayer together despite the state of ionization of the pH sensitive groups.

For example, poly(acrylic acids) and derivatives begin to take on a negative charge within the range of about pH 4 to about 6 and are negatively charged at higher pH levels. Below this transition pH range, however, poly(acrylic acids) are protonated (i.e., uncharged). Similarly, polyamines and derivative thereof take on a positive charge if the pH of the solution is below their $pK_a$. As such, and in accordance with the present invention, the pH of a polyelectrolyte solution may be adjusted by the addition of an acid and/or base in order to attain, maintain, and/or adjust the electrical charge of a polyelectrolyte at the surface of, or within, a polyelectrolyte complex.

The state of ionization, or average charge per repeat unit, for polyelectrolytes bearing pH sensitive groups depends on the pH of the solution. For example, a polyelectrolyte comprising 100 pH insensitive positively charged units, such as DADMA, and 30 pH sensitive negatively charged units, such as acrylic acid, AA, will have a net charge of +100 at low pH (where the AA units are neutral) and an average of +100/130 charge per repeat unit; and a net charge of +70 at high pH (where 30 ionized AA units cancel out 30 of the positive charges) and an average of +70/130 charge per repeat unit. The different monomer units may be arranged randomly along the polymer chain ("random" copolymer) or they may exist as blocks ("block" copolymer). The average charge per repeat unit is also known as the "charge density."

pH sensitive polyelectrolyte complexes comprise pH sensitive polymeric repeat units, selected for example, from moieties containing carboxylates, pyridines, imidazoles, piperidines, phosphonates, primary, secondary and tertiary amines, and combinations thereof. Therefore, preferred polyelectrolytes used in accordance with this invention include copolymers comprising carboxylic acids, such as poly(acrylic acids), poly(methacrylic acids), poly(carboxylic acids), and copolymers thereof. Additional preferred polyelectrolytes comprise protonatable nitrogens, such as poly(pyridines), poly(imidazoles), poly(piperidines), and poly(amines) bearing primary, secondary or tertiary amine groups, such as poly(vinylamines) and poly(allylamine).

To avoid disruption and possible decomposition of the polyelectrolyte complex, polyelectrolytes comprising pH sensitive repeat units additionally comprise pH insensitive charged functionality on the same molecule. In one embodiment, the pH insensitive repeat unit is a positively charged repeat unit selected from the group consisting of repeat units containing a quaternary nitrogen atom, a sulfonium ($S^+$) atom, or a phosphonium atom. Thus, for example, the quaternary nitrogen may be part of a quaternary ammonium moiety ($—N^+R_aR_bR_c$, wherein $R_a$, $R_b$, and $R_c$, are independently alkyl, aryl, or mixed alkyl and aryl), a pyridinium moiety, a bipyridinium moiety or an imidazolium moiety, the sulfonium atom may be part of a sulfonium moiety ($—S^+R_dR_e$ wherein $R_d$ and $R_e$ are independently alkyl, aryl, or mixed alkyl and aryl) and the phosphonium atom may be part of a phosphonium moiety ($—P^+R_fR_gR_h$ wherein $R_f$, $R_g$, and $R_h$ are independently alkyl, aryl, or mixed alkyl and aryl). In another embodiment, the pH insensitive repeat unit is a negatively charged repeat unit selected from the group consisting of repeat units containing a sulfonate ($—SO_3^-$), a phosphate ($—OPO_3^-$), or a sulfate ($—SO_4^{31}$).

Exemplary negatively charged pH insensitive charged repeat units include styrenesulfonic acid, 2-acrylamido-2-methyl-1-propane sulfonic acid, sulfonated lignin, ethylenesulfonic acid, methacryloxyethylsulfonic acid, sulfonated ether ether ketone, phosphate. Preferred pH insensitive negatively charged polyelectrolytes include polyelectrolytes comprising a sulfonate group ($—SO_3^-$), such as poly(styrenesulfonic acid) (PSS), poly(2-acrylamido-2-methyl-1-propane sulfonic acid) (PAMPS), sulfonated poly (ether ether ketone) (SPEEK), sulfonated lignin, poly(ethylenesulfonic acid), poly(methacryloxyethylsulfonic acid), their salts, and copolymers thereof.

Exemplary positively charged pH insensitive repeat units include diallyldimethylammonium, vinylbenzyltrimethylammonium, vinylalkylammoniums, ionenes, acryloxyethyltrimethyl ammonium chloride, methacryloxy(2-hydroxy) propyltrimethyl ammonium, N-methylvinylpyridinium, other N-alkylvinyl pyridiniums, a N-aryl vinyl pyridinium, alkyl- or aryl imidazolium, sulfonium, or phosphonium. Preferred pH insensitive positively-charged polyelectrolytes comprising a quaternary ammonium group, such as poly (diallyldimethylammonium chloride) (PDADMA), poly(vinylbenzyltrimethylammonium) (PVBTA), poly(alkyammoniums), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group such as poly(N-methylvinylpyridinium) (PMVP), other poly(N-alkylvinylpyridines), and copolymers thereof.

For illustrative purposes, certain of the pH insensitive positively-charged moieties are illustrated below:

Pyridinium having the structure:

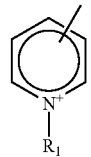

wherein $R_1$ is optionally substituted alkyl, aryl, alkaryl, alkoxy or heterocyclo. Preferably, $R_1$ is alkyl or aryl comprising from 1 to about 12 carbon atoms, and still more preferably $R_1$ is methyl;

Imidazolium having the structure:

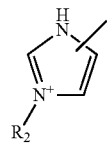

wherein $R_2$ is optionally substituted alkyl, aryl, alkaryl, alkoxy or heterocyclo. Preferably, $R_2$ is alkyl or aryl comprising from 1 to about 12 carbon atoms, and still more preferably $R_2$ is methyl;

Bipyridinium having the structure:

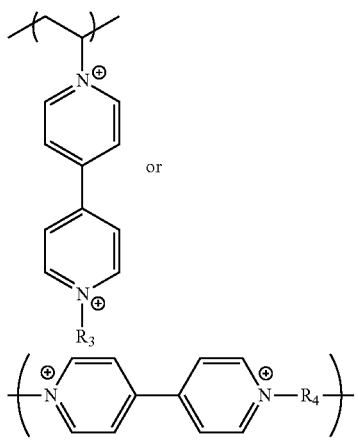

or wherein $R_3$ and $R_4$ are optionally substituted alkyl, aryl, alkaryl, alkoxy or heterocyclo. Preferably, $R_3$ and $R_4$ are alkyl or aryl comprising from 1 to about 12 carbon atoms, and still more preferably $R_3$ is methyl.

The pH insensitive polyelectrolyte may comprise a repeat unit that contains protonatable functionality, wherein the functionality has a pKa outside the range of experimental use. For example, poly(ethyleneimine) has protonatable amine functionality with pKa in the range 8-10, and is thus fully charged (protonated) if the experimental conditions do not surpass a pH of about 7.

Preferably, the pH insensitive groups constitute about 10 mol % to about 100 mol % of the repeat units of the polyelectrolyte, more preferably from about 20 mol % to about 80 mol %. Preferably, the pH sensitive groups constitute about 30 mol % to about 70 mol % of the repeat units of the polyelectrolyte.

Optionally, the polyelectrolytes comprise an uncharged repeat unit that is not pH sensitive in the operating pH range, for example, about pH 3 to about pH 9. Said uncharged repeat unit is preferably hydrophilic. Preferred uncharged hydrophilic repeat units are acrylamide, vinyl pyrrolidone, ethylene oxide, and vinyl caprolactam. The structures of these uncharged repeat units are shown in Table II. Preferred uncharged repeat units also include N-isopropylacrylamide and propylene oxide.

TABLE II

| Neutral Repeat Units | |
|---|---|
| Name | Structure |
| Acrylamide | |
| Vinylpyrrolidone | |
| Ethylene oxide | |

TABLE II-continued

| Neutral Repeat Units | |
|---|---|
| Name | Structure |
| Vinylcaprolactam | |

Adsorption is driven by the net influence of various interdependent interactions between and within surfaces and biopolymer. Possible polyelectrolyte interactions can arise from 1) van der Waals forces 2) dipolar or hydrogen bonds 3) electrostatic forces 4) hydrophobic effects. Given the apparent range and strength of electrostatic forces, it is generally accepted that the surface charge plays a major role in adsorption. However, adsorbers such as proteins are remarkably tenacious, due to the other interaction mechanisms at their disposal. It is an object of this invention to show how surfaces may be selected to encourage or discourage the adsorption of proteins to rough polyelectrolyte complex coatings when they are used in vivo or in natural environments. Protein adsorption may be discouraged by incorporating, preferably at the external surface, polyelectrolytes comprising repeat units having hydrophilic groups and/or zwitterionic groups.

Polyelectrolyte complexes comprising zwitterions useful for preventing protein and/or cell adhesion have been described in U.S. Pat. Pub. No. 20050287111. It has been found that polymers comprising zwitterionic functional groups alone do not form polyelectrolyte complexes if they are employed under conditions that maintain their zwitterionic character. This is because the charges on zwitterionic groups do not exhibit intermolecular interactions. Therefore, preferred polymers comprising zwitterionic groups also comprise additional groups capable of intermolecular interactions, such as hydrogen bonding or ion pairing. More preferably, polyelectrolytes comprising zwitterionic groups also comprise charged groups that are not zwitterionic. Zwitterionic groups are present on polyelectrolytes as blocks or randomly dispersed throughout the polymer chain. Preferably, polyelectrolytes comprise between about 1% and about 90% zwitterions units, and more preferably said polyelectrolyte comprises between about 10% and about 70% zwitterionic units. Preferred compositions of polyelectrolytes comprising zwitterionic repeat units also comprise between about 10% and about 90% non-zwitterionic charged repeat units. Preferred zwitterionic repeat units are poly(3-[2-(acrylamido)-ethyldimethyl ammonio] propane sulfonate) (PAEDAPS) and poly(N-propane sulfonate-2-vinyl pyridine) (P2PSVP). The structures of these zwitterions are shown in Table III. Examples of other suitable zwitterionic groups are described in U.S. Pat. Pub. No. 20050287111, which is hereby incorporated by reference.

TABLE III

Zwitterionic Repeat Units

| Name | Structure |
|---|---|
| 3-[2-(acrylamido)-ethyldimethyl ammonio] propane sulfonate (AEDAPS) | (structure shown) |
| N-propane sulfonate-2-vinyl pyridine (2PSVP) | (structure shown) |

It has been disclosed (U.S. Pat. Pub. No. 20050287111) that films of polyelectrolyte complex prepared by the multilayering method are able to control the adsorption of protein. It is also generally known by those skilled in the art that hydrophilic units, such as ethylene oxide (or ethylene glycol), generally containing —C—O— repeat units, are effective in reducing the overall propensity of biological macromolecules, or biomacromolecules, to adsorb to surfaces (see Harris, *Poly(ethylene glycol) Chemistry: Biotechnical and Biomedical Applications*, Plenum Press, New York, 1992). Yang and Sundberg (U.S. Pat. No. 6,660,367) disclose materials comprising ethylene glycol units that are effective at resisting the adsorption of hydrophilic proteins in microfluidic devices. The ethylene oxide (or ethylene glycol) repeat units are preferably present as blocks within a block copolymer. Preferably, the block copolymer also comprises blocks of charged repeat units, allowing the material to be incorporated into a polyelectrolyte complex. Sufficient ethylene oxide repeat units are required to promote resistance to protein adsorption, but too many ethylene oxide units do not allow polyelectrolyte complexes to associate. Therefore, the preferred moles ratio of charged to neutral repeat units in a polyelectrolyte complex is from 10:1 to 1:4, and a more preferred ratio is 5:1 to 1:2.

Ethylene oxide repeat units may also be employed in comb polymers, preferably with a main, charged chain comprising a plurality of at least one of the charged repeat units listed previously and oligomers or polymers of ethylene oxide units grafted to this main chain. Such an architecture is termed a comb polymer, where the charged backbone represents that backbone of the comb and the grafted ethylene oxide oligomers or polymers represent the teeth of the comb.

Preferably the location of the zwitterionic and/or polyethylene oxide repeat units is at the external surface rough polyelectrolyte complex coating. In order to provide anti-biofouling properties to the rough polyelectrolyte complex coating the zwitterionic and/or polyethylene oxide repeat units are sorbed on the coating after it is deposited, for example by exposing the article to a solution comprising a polyelectrolyte comprising zwitterionic or ethylene oxide repeat units. Alternatively, the zwitterionic or ethylene oxide functionality can be chemically grafted to the surface of the rough polyelectrolyte complex coating using chemical grafting or coupling methods.

In some applications, the surface of the strained polyelectrolyte complex is rendered bioadhesive, for example by the sorption of peptides (synthetic or natural) or proteins, such as fibronectin, comprising the RGD sequence of amino acids, as disclosed in U.S. Pat. Pub. No. 20030157260 and U.S. Pat. No. 6,743,521. In other embodiments the surface of the strained polyelectrolyte complex comprises 3,4-dihydroxyphenylalanine (DOPA) or catechol units, which are known to be bioadhesive. In further embodiments the surface of the stored strain polyelectrolyte complex further comprises reactive functional groups, such as aldehydes, ketones, carboxylic acid derivatives, anhydrides (e.g., cyclic anhydrides), alkyl halides, acyl azides, isocyanates, isothiocyanates, and succinimidyl esters. These groups react with amine groups found in biological tissue. Thus, an article comprising said groups adheres to tissue.

In one preferred embodiment, chemical crosslinking is introduced into the rough polyelectrolyte complex coating for stability and toughness. After applying the rough coating, it may be treated with a difunctional crosslinking agent, such as $XCH_2$-$\varphi$-$CH_2X$, where X is a halogen (Cl, Br, or I) and $\varphi$ is a phenyl group. The phenyl group may be replaced by another aromatic or aliphatic moiety, and easily-diplaceable groups, such as toluene sulfonate, may replace the halogen. A preferred crosslinking agent is a dihalogenated compound, such as an aromatic or aliphatic dibromide, which is able to alkylate residual unalkylated units on two adjoining polyelectrolyte chains.

Another preferred method of chemical crosslinking a polyelectrolyte complex after straining is heat treatment. For example, Dai et al. (*Langmuir* 17, 931 (2001)) disclose a method of forming amide crosslinks by heating a polyelectrolyte multilayer comprising amine and carboxylic acid groups. Yet another preferred method of introducing crosslinking, disclosed by Kozlovskaya et al. (Macromolecules, 36, 8590 (2003)) is by the addition of a carbodiimide, which activates chemical crosslinking. The level of chemical crosslinking is preferably between about 0.01% and about 50% as measured as a percentage of total ion pairs within the polyelectrolyte complex, and more preferably between about 0.1% and about 10% as measured as a percentage of total ion pairs within the polyelectrolyte complex.

Another method of chemical crosslinking of a rough polyelectrolyte complex film is by photocrosslinking. Photocrosslinking may be achieved by the light-induced decomposition or transformation of functional groups, such as diarylbenzophenones, that form part of the polymer molecules. See, for example, Strehmel, Veronika, "Epoxies: Structures, Photoinduced Cross-linking, Network Properties, and Applications"; Handbook of Photochemistry and Photobiology (2003), 2, 1-110. See also Allen, Norman S., "Polymer photochemistry", Photochemistry (2004), 35, 206-271; Timpe, Hans-Joachim "Polymer photochemistry and photocrosslinking" Desk Reference of Functional Polymers (1997), 273-291, and Smets, G., "Photocrosslinkable polymers", Journal of Macromolecular Science, Chemistry (1984), A21 (13-14), 1695-703. Alternatively, photocrosslinking of a polyelectrolyte complex may be accomplished by infusing the reformed polyelectrolyte complex with a small photoactive crosslinker molecule, such as diazidostilbene, then exposing the polyelectrolyte complex to light.

In some embodiments, the polyelectrolyte complex comprises further physical crosslinks created by hydrogen bonding. Hydrogen bonding is weaker than chemical bonding and occurs between a hydrogen bond donor and a hydrogen bond acceptor. Hydrogen bonds are minimally impacted by the presence of salt and thus the level of physical crosslinking due to hydrogen bonding remains substantially the same as the salt concentration is varied. Accordingly, the polyelectrolyte complex further comprises polymer repeat units capable of hydrogen bonding. Examples of hydrogen bond donor/acceptor pairs are presented in U.S. Pat. Nos. 6,740,409 and 7,470,449 as well as U.S. Pat. Pub. No. 20050163714.

II. Doping Level

As stated above, doping of the polyelectrolyte complex affects the elastic and dynamic mechanical properties of the rough polyelectrolyte complex coating, such as, for example, the elastic and complex shear modulus. It has been observed that doping by increasing the salt concentration decreases the modulus of a polyelectrolyte complex, e.g., shear modulus, G. Conversely, decreasing the salt concentration increases G, making the complex stiffer.

The process of doping is defined as the breaking of polymer/polymer ion pair crosslinks by salt ions entering the polyelectrolyte complex, i.e., the opposite of Equation (1). Salt ions electrically compensate the charges on the polyelectrolytes. In such compensation, the salt ions are termed counterions and are paired with polyelectrolyte repeat units of opposite charge. Salt ions residing in pores or paired with other salt ions or present as crystals are not considered to be doping the polyelectrolyte complex and do not contribute to the doping level. The level or density of doping is therefore inversely related to the crosslink density. The breaking of ion pair crosslinks by doping is reversible and under thermodynamic control. In contrast, chemical crosslinks are usually irreversible.

The doping level of polyelectrolyte complexes is created and maintained by contacting the starting polyelectrolyte complex with a solution comprising salt ions of a specific concentration. Equilibration of the polyelectrolyte complex in the salt solution in which the complex is immersed may be fairly rapid, with durations typically on the order of between about 10 minutes and about 60 minutes per millimeter thickness of the polyelectrolyte complex article.

The extent to which ion pair crosslinks have been replaced by salt counterions within the bulk of the article comprising polyelectrolyte complex may be quantified in terms of a doping level or doping level ratio, determined by dividing the sum of the ionic charge provided by salt ions acting as polyelectrolyte counterions by the sum of charge provided by the polymer repeat units. This ratio may be expressed in terms of a doping level percentage by multiplying the doping level ratio by 100. The lowest doping level is 0.0 (0%) wherein all the positively charged polyelectrolyte repeat units are paired with all the negatively charged polyelectrolyte repeat units, which corresponds to the maximum level (100%) of ionic crosslinking. The highest doping level is 1.0 (100%), where all charged polyelectrolyte repeat units are paired with a salt ion. When the doping level is 1.0 the polyelectrolytes are dissociated: phase separation can occur between components; additives can phase separate, and solutions do not maintain their shape when reformed. At a doping level of 1.0, the polyelectrolyte complex is dissolved, or maintained in solution, as described in U.S. Pat. No. 3,546,142. Dissolved polyelectrolyte complexes are not preferred for the present invention.

The doping level can be measured, for example by infrared absorption spectroscopy (see e.g., Farhat and Schlenoff, *Langmuir* 2001, 17, 1184; and Farhat and Schlenoff, *Journal of the American Chemical Society,* 2003, vol. 125, p. 4627.) This technique has been used to measure doping levels below about 0.5. The doping level of a stoichiometric (1:1) polyelectrolyte complex is the fraction of polymer/polymer ion pairs which have been broken.

To illustrate a doping level calculation, suppose that a simple polyelectrolyte complex comprises a blend of one positively charged polyelectrolyte having 100 positively charged repeat units paired with one negatively charged polyelectrolyte having 100 negatively charged repeat units. Such a polyelectrolyte complex therefore has a total charge provided by the charged repeat units of 200. The maximum number of ionic crosslinks, or polymer/polymer ion pairs, is 100. This polyelectrolyte complex may be doped with salt ions which become associated with the charged repeat units. For example, if 10 sodium ions are associated with 10 negatively charged repeat units and 10 chloride ions are associated with 10 positively charged repeat units, the sum of charges provided by the salt ions is 20, and 10 ionic crosslinks have been broken. The doping level is a ratio calculated by dividing the sum of charges of the salt ions paired with polyelectrolytes by the sum of charges from the repeat units, i.e., 20/200=0.1, or 10%, stated as a doping level percentage. By way of further example, if 5 calcium ions (charge 2+) are associated with 10 negatively charged repeat units and 10 chloride ions are associated with 10 positively charged repeat units, the sum of charges provided by the salt ions is 20 (=5×2 for the calcium+10 for the chloride) and the doping level ratio is 20/200=0.1, or 10%, stated as a doping level percentage. To achieve these doping levels, the article comprising the polyelectrolyte is preferably maintained in contact with a solution of the doping salt in water.

It has been shown quantitatively that the mechanical properties of articles comprising polyelectrolyte complex are influenced by the doping level. For example, Jaber and Schlenoff (e.g. see Journal of the American Chemical Society, 2006, vol. 128, p. 2940 and also U.S. Pat. No. 8,206,816) analyzed the mechanical properties of articles comprising nonporous polyelectrolyte complexes using classical theories of rubber elasticity. The elastic modulus of articles comprising polyelectrolyte complexes decreased as they were doped with salt ions. In the doping level range studied, which was about 0 to about 0.4, the articles were elastically deformed, meaning that they regained their original shape when the deforming force was removed.

In the present invention, the doping level must be sufficiently high to reduce the viscosity, i.e., dynamic shear viscosity, of the doped polyelectrolyte complex to a value lower than about 10E5 cP. The viscosity is preferably measured at room temperature using a device known to the art such as a viscometer or a rheometer. The viscosity may be measured at room temperature, e.g., a temperature generally between about 20° C. and about 26° C. At these viscosities the complex has liquid-like properties and may be applied as a coating by any one of a number of coating methods known to be useful for viscous liquids. Accordingly, the preferred level of doping of the polyelectrolyte complex is between 0.5 and 0.99, more preferably between 0.8 and 0.99. The polyelectrolyte is doped to an appropriate level by exposure to an aqueous salt solution comprising salt ions.

III. Salt Ions.

A wide variety of salt ions may be added to the polyelectrolyte complex to dope the starting polyelectrolyte complex. In general, the salt may comprise any cation selected from among the alkali metal cations, alkaline earth metal cations, transition metal cations, semi-metallic cations, and organic cations such as amines or quaternary ammoniums. The salt(s) may comprise a mixture of two or more of any of these cations. Among the alkali metal cations, lithium, sodium, potassium, and rubidium may be incorporated into the polyelectrolyte complex, with sodium and potassium being particularly preferred. In certain physiological applications, the choice of alkali metal cations may be limited to sodium or potassium ions. Among the alkaline earth metal cations, magnesium, calcium, strontium, and barium may be incorporated into the polyelectrolyte complex. Calcium and magnesium cations are particularly preferred, and for physiological applications, the choice of alkaline earth metal cations may be limited to calcium and magnesium. A wide variety of transition metals may be incorporated into the polyelectrolyte complex including scandium, yttrium, titanium zirconium, vanadium, niobium, chromium, molybdenum, manganese, iron, ruthenium, cobalt, rhodium, nickel, palladium, platinum, copper, silver, gold, and zinc. In certain physiological applications, the choice of transition metal cations may be limited to zinc, iron, and copper. Other metal cations that may be incorporated into the extruded articles include aluminum, silver, indium, tin, lead, and bismuth. Organic cations that may be included include ammonium, primary, secondary, and tertiary amines, and quaternary ammoniums comprising alkyl groups having from one to eight carbon atoms. Primary amines, secondary amines, and tertiary amines are protonated to achieve positive charge and are thus pH sensitive. Exemplary primary amines, secondary amines, and tertiary amines are protonated forms of methylamine, dimethylamine, trimethyl amine, ethylamine, diethylamine, and triethylamine among others. Quaternary amines are pH insensitive groups. Exemplary quaternary amines include tetramethylammonium, tetraethylammonium, tetrapropylammonium, among others. In one embodiment, the amine is a linear polyamine such as ethylene diamine, diethylene triamine, dipropylene triamine, triethylene tetraamine, tripropylene tetraamine, tetraethylene pentaamine, tetrapropylene pentaamine, spermine, or spermidine.

The anion may be selected from among halide anions, oxoanions, and organic anions. A combination of anions may be incorporated into the polyelectrolyte complex. Halide ions that may be incorporated into the polyelectrolyte complex include fluoride, chloride, bromide, and iodide. In one preferred embodiment, the halide anion is chloride ion. Oxoanions that may be incorporated into the polyelectrolyte complex include sulfonate, sulfate, sulfite, phosphate, phosphite, phosphonate, pyrophosphate, hypochlorite, chlorite, chlorate, perchlorate, iodate, periodate, bromate, borate, carbonate, nitrate, nitrate, aluminate, and manganate, among others. Organic anions that may be incorporated into the polyelectrolyte complex include carboxylates, such as citrate, lactate, acetate, benzoate, formate, malate, malonate, fumarate, oxalate, propionate, butyrate, tartrate, and valerate, phthalate, among others. Hydrophobic anions, such as those with a high hydrocarbon to charge ratio, are preferred for enhancing doping. Preferred organic anions for physiological applications include citrate and lactate. Organic solvent is optionally added to the aqueous salt solution during doping.

Other preferred salts include chloride salts, citrate salts, and phosphate salts. Preferred chloride salts include sodium chloride, potassium chloride, magnesium chloride, calcium chloride, and aluminum chloride. Preferred citrate salts include trisodium citrate, disodium hydrogencitrate, sodium dihydrogencitrate, tripotassium citrate, dipotassium hydrogencitrate, potassium dihydrogencitrate, magnesium citrate, and calcium citrate. Preferred phosphate salts include trisodium phosphate, disodium hydrogen phosphate, sodium dihydrogen phosphate, tripotassium phosphate, dipotassium hydrogen phosphate, potassium dihydrogen phosphate, disodium potassium phosphate, sodium dipotassium phosphate, sodium potassium hydrogen phosphate, calcium phosphate, and magnesium phosphate.

In general, it has been found that the higher the charge on the ion the more effectively it dopes the polyelectrolyte complex. Thus, double-charged ions such as calcium are more effective than single-charged ions such as sodium. Triple-charged ions are even more effective.

In view of the above cations and anions, a wide variety of salts may be incorporated into the polyelectrolyte complex starting material for the purpose of doping. Preferably, the salts are soluble in aqueous solution at a concentration at least sufficient to incorporate ions into the polyelectrolyte complex starting material to an extent sufficient to achieve the doping level needed for the desired viscosity.

Viscous doped polyelectrolyte complex in water formed, for example, by adding salt solution to the starting polyelectrolyte complex, is herein termed "the polyelectrolyte complex dope" or simply "the dope". While the preferred method of preparing the dope is to contact the starting polyelectrolyte complex with a salt solution, it is also possible to prepare the dope by adding the individual polyelectrolyte components to the salt solution. The eventual composition is comparable. For example, to a concentrated salt solution, solutions of positive polyelectrolyte and negative polyelectrolyte are added. Alternatively, concentrated salt can be added to the solutions of polyelectrolyte before they are mixed. Said solutions of polyelectrolyte, with or without salt, may be added simultaneously or sequentially. The dope contains a fluid polyelectrolyte complex. The advantages of preparing a starting polyelectrolyte, then doping it to the desired level, are twofold: first, on precipitating the complex, small molecule impurities, such as residual monomers, are left behind in the supernate, leading to a purer complex. Second, when polyelectrolytes are mixed to form the complex the precipitated complex is usually close to stoichiometric. Thus, if the starting polyelectrolyte complex is dried, powdered, and used as starting material for preparing the dope, the composition is known to be close to 1:1.

The dope may optionally comprise organic solvent such as ethanol. Preferably the dope does not comprise volatile organics, as coatings which can be applied without releasing volatile organics to the environment are advantageous. If an organic solvent is to be used as a co-solvent with water, the organic solvent preferably has low toxicity.

The dope is not a solution of dissolved polyelectrolyte complex, i.e., the dope comprises a polyelectrolyte complex with a doping level less than 1.00. A solution of dissolved polyelectrolyte complex does not actually comprise a complex of polyelectroytes, since all the polyelectrolyte chains are separated. There are several methods to establish whether the solution comprises a polyelectrolyte complex, wherein the doping level is less than 1.00, or, in fact, comprises dissolved polyelectrolyte, wherein the doping level is 1.00. The first method is to vary the salt concentration and measure the viscosity. If the viscosity changes strongly with salt concentration, the doping level is less than 1.00. If the viscosity changes weakly with salt concentration, the doping level is 1.00. An example of this difference is provided below.

Another method to establish that the doping level is below 1.00 is to allow the dope to sit in salt solution for a while. If there is a phase separation, where part of the solution is concentrated in polyelectrolyte and part is dilute in polyelectrolyte, the doping level is below 1.00.

Preparation of the dope may proceed from the starting electrolyte by adding more and more salt until the desired salt concentration is reached, or it may proceed starting with a dissolved solution of polyelectrolytes (dissolved polyelectrolyte complex) then adding water to dilute the salt concentration which, when low enough, leads to doping with a level less than 1.00 and formation of a polyelectrolyte complex. In some embodiments, the doping level of the "dope" is between about 0.70 and about 0.999, such as between about 0.80 and about 0.999, or between about 0.80 and about 0.99.

The preferred method of coating employs any coating technique known to the art such as doctor blading, painting, spraying, rod coating, web coating, dip coating, spin-on, brush-on, and coating with rollers.

IV. Viscosity.

A level of doping lower than 1.00 but high enough to provide the preferred viscosity is required. In some embodiments, the doping level of the "dope" is between about 0.70 and about 0.999, such as between about 0.80 and about 0.999, or between about 0.80 and about 0.99. The viscosity is preferably measured at room temperature using a device known to the art such as a viscometer or a rheometer. The viscosity may be measured at room temperature, e.g., a temperature generally between about 20° C. and about 26° C. Units of viscosity vary. Some conversions are as follows: 100 Centipoise (cP)=1 Poise; 1 Centipoise=1 mPa s (Millipascal Second); 1 Poise=0.1 Pa s (Pascal Second); Centipoise=Centistoke×Density.

The preferred viscosity is optimized to allow the dope to be applied to a surface by the particular coating method chosen. Some methods are suited to different viscosity ranges than others. Water has a viscosity of around 1 cP. SAE motor oil around 600 cP; honey around 10,000 cP; peanut butter around 250,000 cP. Clearly, a high viscosity is more suited to a method where the dope is physically spread by a blade, whereas dip-coating and spraying rely on lower viscosities.

The preferred viscosity of the polyelectrolyte complex dope without additives is sufficient to prevent dripping, running, dribbling, streaking, etc. of the surface after it is applied on a vertical surface. Accordingly, preferred viscosities are greater than 10 cP, more preferably greater than 100 cP and yet more preferably greater than 1000 cP. At the same time, the viscosity of the dope should be low enough to allow the dope to be spread efficiently. Accordingly, preferred viscosities are less than 10E5 cP, more preferably less than 10E4 cP. The corresponding doping levels may be defined by a doping level vs. solution salt concentration such as the ones provided in the Examples. Additives increase viscosity of the coating mixture, especially if the additives are fibrous.

The preferred storage shear modulus and loss shear modulus of the dope without additives are both less than 100 Pa at room temperature and at 0.1 Hz. At higher modulii the complex begins to take on solid-like properties, which are undesired for a coating mixture.

Undoped polyelectrolyte complexes are obtained by soaking polyelectrolyte complexes in water.

V. Methods of Forming the Coating.

In one preferred embodiment of the present invention, a method of forming the rough polyelectrolyte complex coating involves applying the dope as a coating to an article. The salt within the dope is rapidly washed out of the dope by rinsing with water. In some embodiments, the endpoint doping level is less than 0.7, preferably less than 0.5 and more preferably less than 0.2. The resulting coating is uniform and rough, as seen in the example below. To save time, the rinse is preferably applied before the coating is dry, but optionally applied after the coating is dry. When this method was first employed it was assumed that the salt would simply leave the complex and a smooth film would be left behind. The rough coating obtained was unexpected. The mechanism for generation of this roughness is unknown.

Accordingly, the method of forming the rough polyelectrolyte coating comprises spreading the polyelectrolyte complex dope having a doping level of less than 1.00 on a substrate to form a film or coating and then treating said coating with solvent, preferably water. The water is preferably sprayed on from a nozzle or hose. Sufficient wash is applied to bring the doping level down to the preferred level. Optionally, the water can be applied by an object soaked in water, such as sponge, in which case the surface of the coating is textured by the sponge.

Optionally, the coating can be transiently textured before rinsing. For example, the coating can be scraped with a sponge or a comb then rinsed. Preferably, the time between texturing and rinsing is minimized to preserve the texturing features. If the time between texturing and rinsing is long enough the texturing of the surface can be lost as the surface tension of the coating makes the film smooth again.

Optionally, the rinsing water comprises the same, or a different, salt as the polyelectrolyte complex dope. In some preferred embodiments, the salt concentration of the rinsing solution is less than that of the polyelectrolyte complex dope. For example, the polyelectrolyte complex dope could comprise KBr at a concentration of 1.7M and the rinse solution could comprise NaCl at 0.6M. The second salt concentration is insufficient to dope the polyelectrolyte complex to a high enough viscosity to assume liquid-like properties. In this example, the rinse solution could conveniently be seawater.

Roughness is desired to texture the surface of the polyelectrolyte complex film on a micrometer level in order to create microturbulence and reduce drag. A possible additional benefit is that particles adhere less to rough surfaces when they are under flow conditions. Roughness is typically stated as root mean square or RMS roughness. The calculation for determining RMS roughness is as follows:

$$R_{rms} = \sqrt{\frac{1}{n}\sum_{i=1}^{n} y_i^2}$$

The roughness along a line of n equally spaced points where $y_i$ is the vertical distance from the ith point to the mean line through the points. The mean line defines an average height, i.e., the area of roughness features above the mean line is approximately equal to the area of roughness features below the mean line. Stated another way, the sum of distances below the mean line (may be considered as having a negative distance or height) and above the mean line (may be considered as having a positive distance or height) as measured along a line of n equally spaced points is approximately zero. To measure the root mean square roughness, the negative distances and positive distances are squared, thereby converting negative values into positive values. The values, now all positive, are summed, and this value is divided by the number, n, of points measured. The root mean square is calculated by taking the square root of this value.

In accordance with this invention, the desired RMS roughness of the polyelectrolyte complex film, i.e., the surface in contact with solution, is preferably greater than 100 nm. More preferably the roughness is greater than 1 micrometer. On the other hand, roughness should not be too excessive such that it causes additional or excessive drag. Hence the roughness is preferably less than 1 mm, more preferably less than 100 micrometer. The RMS lateral distance between roughness features, i.e., the spacing between these features, is preferably between 1 micrometers and 1000 micrometers, and more preferably between 10 and 100 micrometers.

It should be emphasized that the roughness in the polyelectrolyte complex coating is spontaneously generated by the polyelectrolyte complex itself and is not the result of particles added to the polyelectrolyte complex. Accordingly, in one preferred embodiment, the rough polyelectrolyte film comprises added particles which give the polyelectrolyte complex coating two length scales of roughness. For example, particles, such as glass powder, of diameter 10 micrometers may be mixed with the dope and the film applied by a coating rod to a surface. The resulting dried film comprises both roughness of about 10 micrometers, created by the contours of the glass powder, and roughness of about 1 micrometer, created by the inherent properties of the polyelectrolyte complex dope itself.

In some embodiments, the polyelectrolyte complex of the present invention may have roughness having two or more roughness scales. That is, the surface may comprise roughness features that are measurable using two scales, three scales, or even four or more scales. The roughness scales may differ from each other, e.g., by factors or 2, 4, 10, or even 100. With reference to FIG. 1, the concept of a coating having two roughness scales is illustrated. The roughness is idealized and overly periodic for illustration purposes. The scale bar is about 100 micrometers. The two scales of roughness are about 100 micrometer and about 10 micrometers. That is, the two scales of roughness differ by a factor of about 10. The surface roughness of the two scales of roughness each may be measured by the root mean square calculation discussed above. The root mean square roughness of the smaller scale roughness features may be calculated using several values within about 10 micrometers of each other, while the root mean square roughness of the larger scale roughness features may be calculated using several values within about 100 micrometers of each other. The polyelectrolyte complex may comprise roughness that may be measured along three or more scales, each measurable according to the RMS roughness calculation provided above.

In another example, nanoparticles of average diameter 100 nm could be mixed with the polyelectrolyte complex dope and the film applied. In such a case, the film could have roughness on a scale of about 1 micrometer caused by the inherent properties of the application process (see Example below) and the film would comprise further roughness on the scale of 100 nm from the added (nano)particles. In this example, the two scales of roughness differ by a factor of about 10. In yet another example, nanoparticles of average diameter of 10 nm may be mixed into the polyelectrolyte complex to achieve roughness on three different length scales, i.e., of 10 nm, of 100 nm, and of 1 micrometer. Each length scale differs by a factor of about 10.

In accordance with this invention, the rough polyelectrolyte complex film optionally comprises surface roughness on two length scales, i.e., a first surface roughness having a first length scale and a second surface roughness having a second length scale. In some embodiments, the rough polyelectrolyte complex film may comprise surface roughness on three length scales, i.e., a first surface roughness having a first length scale, a second surface roughness having a second length scale, and a third surface roughness having a third length scale. Further embodiments may comprise roughness on four or more different length scales. In some embodiments, the two length scales of roughness differ by more than a factor of 2, such as at least about 4, at least about 10, or even at least about 100. For example, the polyelectrolyte complex may comprise a first surface roughness having roughness of about a 1 micrometer length scale and a second surface roughness on a 2 micrometer length scale, a 4 micrometer length scale, a 10 micrometer length scale, or even a 100 micrometer length scale. In another example, the polyelectrolyte complex may comprise a first surface roughness having roughness of about a 10 micrometer length scale and a second surface roughness on a 20 micrometer length scale, a 40 micrometer length scale, a 100 micrometer length scale, or even a 1000 micrometer length scale.

As seen in the Examples below, doping, or the introduction of small counterions, reduces the modulus of the polyelectrolyte complex. Nonstoichiometric complexes have excess counterions of one charge and are thus softer than stoichiometric counterions. Accordingly, the polyelectrolyte stoichiometry of the external surface of the rough polyelectrolyte complex coating is preferably 1:1. In coatings where this external surface stoichiometry is not 1:1, the stoichiometry may be adjusted towards 1:1 by treating the rough polyelectrolyte complex coating with a solution of polyanion or polycation. For example, if the surface is slightly rich in polycation, the coating can be immersed in, or contacted with, a solution comprising polyanion and, optionally, a salt.

In another embodiment of this invention different layers or strata of rough polyelectrolyte complex coatings are applied to a surface. For example, a dope comprising a polyelectrolyte complex of a first composition is applied as a rough coating, then, on top of this, a polyelectrolyte of a second composition is applied as a rough coating. Accordingly several strata, each preferably from 1 to 1000 micrometer thick, more preferably from 10 to 100 micrometers thick, may be laid down on a substrate. Following deposition, each stratum comprises an external surface of the preferred roughness. After the following stratum is deposited, the external surface of the preceding stratum becomes an internal surface. Preferably, the salt concentration of the following stratum is insufficient to dissolve or destabilize the preceding stratum.

VI. Substrate.

In some embodiments of the present invention, an article may be prepared by coating a substrate with a rough polyelectrolyte complex film. Preferred substrates for the rough polyelectrolyte complex coating include metal, primed metal, wood, concrete, plastics such as polyethylene, polyurethane, silicone rubbers, polypropylene, polyvinylchloride, poly acrylates and any engineering plastic such as polyethers, polycarbonates, polyamides, and polysulfones. In some embodiments, the article may comprise wood or metal, which may be exposed to water. For example, the article coated with rough polyelectrolyte complex may be a boat hull. In some embodiments, the article may be a pipe. In some embodiments, the article may come in contact with biological fluids, such as an implanted device.

VII. General Additives.

Solid additives that may be incorporated into the polyelectrolyte complex are typically known to the art to modify the physical properties of materials. Additives are not considered in the doping calculations. The preferred weight% of metallic, mineral, polymer, or carbon additive is between 0.1 wt % and 90 wt % relative to the weight of polyelectrolytes. Additives include fillers and/or reinforcing agents and/or toughening agents, such as inorganic materials such as metal or semimetal oxide particles (e.g., silicon dioxide, aluminum oxide, titanium dioxide, iron oxide, zirconium oxide, and vanadium oxide), clay minerals (e.g., hectorite, kaolin, laponite, attapulgite, montmorillonite), hydroxyapatite or calcium carbonate. For example, nanoparticles of zirconium oxide added to an ultrathin film of polyelectrolyte complex improves the abrasion resistance of the film. See Rosidian et al., *Ionic Self-assembly of Ultra Hard $ZrO_2$/polymer nanocomposite Films*, Adv. Mater. 10, 1087-1091 and U.S. Pat. No. 6,316,084.

In another aspect of this invention electrically conducting particles are added to the polyelectrolyte complex dope prior to coating an article. These conducing materials absorb electromagnetic radiation and they allow the rough polyelectrolyte complex coating to dissipate electricity. Examples of electrically conducing particles include metal powders, wires or flakes, carbon fiber, carbon nanotubes and graphene.

High aspect ratio fillers are preferred for stiffening or strengthening a coating at a relatively low fill loading. Preferred high aspect ratio additives include metal fibers, inorganic platelets such as calcium carbonate or calcium phosphate (such as hydroxyapatite), needle-like clay minerals, such as attapulgite and halloysite, and carbon-based fibers such as carbon fibers or single or multiwalled carbon nanotubes or graphene. Other high aspect ratio materials having at least one dimension in the 1 nanometer to 100 micrometer range are suitable additives. Such high aspect ratio materials include polymer fibers, such as nylon, aramid, polyolefin, polyester, cotton, and cellulose fibers, as well as cellulose nanofibers. The weight % of additives in the rough polyelectrolyte complex coating depends on many factors, such as the aspect ratio and the degree of modification of physical properties required. Accordingly, the solid additives may comprise between about 1 wt % and 90 wt % of the rough polyelectrolyte complex coating.

To create the dual scale roughness features described previously, additives preferably have dimensions to produce one of the roughness scales. For example, if roughness on the scale of about 100 micrometers is desired, particles of additive have diameters of about 100 micrometers may be added to the polyelectrolyte complex. The shape of the particulate additive depends on the packing geometry needed for the surface roughness. Spherical particles pack in a hexagonal close packing structure, which provides a more uniform roughness for the rough polyelectrolyte complex coating.

The Young's modulus of the additive preferably is high (e.g. in the gigapascal range), such as between about 1 GPa and about 300 GPa. Suitable additives include glass, metals or stiff plastics such as polymethylmethacrylate) for coatings that need to be stiff. In some embodiments, the Young's modulus may be low, (e.g. in the megapascal range), such as between about 0.001 megapascal and about 1 megapascal. Such an additive may be rubber for coatings that require toughness. Any engineering plastic in particulate form, where the particles range in diameter from 10 nm to 1 mm, is a suitable additive.

Optionally, small molecules of molecular weight less than 1000 g/mol known to the art to decrease or stop corrosion are added to the dope prior to coating. Such additives are useful if the rough polyelectrolyte complex coating is to be formed on metal.

Additives are added either to the solutions for preparing the starting polyelectrolyte complex, or to the polyelectrolyte complex dope. Negatively charged additives are preferably combined with solutions comprising negative charged polyelectrolytes prior to mixing with solutions comprising positively charged polyelectrolytes so that the additives and polyelectroltyes do not associate prematurely. Additives and individual polyelectrolytes are preferably thoroughly mixed in solution first under shear flow (as created by stirring or a homogenizer) with the proviso that the shear rate should not be sufficient to break the polymer chains. If however, the polyelectrolyte stabilizes and assists in the dispersion of the additive it may be preferable to first mix additive and polyelectrolytes of opposite charge. For example, nanotubes can sometimes be dispersed better in solution if they are "wrapped" with polymers.

For physiological applications of the rough polyelectrolyte complex coating article other additives may be added during the method of the present invention. For example, articles that are to be implanted in vivo may optionally further comprise antibacterial agents and/or anti-inflammation agents and/or antirejection agents and/or growth factors. These additives respectively aid in reducing infection, inflammation or rejection of the implanted article and encouraging tissue proliferation. Examples of antibiotics are well known to the art and are to be found in E. M. Scholar, The Antimicrobial Drugs, New York, Oxford University Press, 2000 or the Gilbert et al., The Stanford Guide to Antimicrobial Therapy, Hyde Park, Vt., 2000, or the R. Reese, Handbook of Antibiotics, Philadelphia, Lippincot, 2000. Antibacterial agents include silver including silver nanoparticles. Other additives are known to the art for promoting various biomedical properties. These include paclitaxel, seratonin, heparin, and anticlotting factors. Unlike additives used to modify the physical properties of the polyelectrolyte complex article, additives with biological or biomedical activity are typically added in lower concentration. Accordingly, such additives preferably comprise between 0.0001% (1 μg/g) and 5% by weight of the polyelectrolyte complex article. The concentration of the additive is typically adjusted to obtain the optimum physiological response.

Additives providing biological or bioactive properties are either mixed with one of the constituent polyelectrolyte solutions before the starting complex is prepared, or they are added to the dope, or they are sorbed into the surface of the complex after the rough polyelectrolyte complex coating is formed.

A hydrophobic surface, for example, a fluorinated polyelectrolyte multilayer, on which smooth muscle cells were grown, has been described in U.S. Pub. No. 2005/0287111, which is herein incorporated by reference. This multilayer comprised fluorinated polyelectrolyte complex, on which cells grow. However, the cells do not consume the fluorinated material.

In another example, a polyelectrolyte multilayer surface comprising fluorinated groups was disclosed in *Macromol-* ecules, 32, 8153 (1999) and then in U.S. Pub. No. 2004/0191504 A1. In one aspect of the present invention, therefore, the rough polyelectrolyte complex coating further comprises an external surface stratum of fluorinated polyelectrolyte. The surface stratum is preferably obtained by immersing the rough complex coating in a solution of fluorinated polyelectrolyte. The process may be repeated with alternating positive and negative fluorinated polyelectrolytes to obtain a thicker surface stratum.

EXAMPLES

The following non-limiting examples are provided to further illustrate the present invention.

Example 1

Preparation of the Starting Polyelectrolyte Complex

Poly(4-styrenesulfonic acid, sodium salt) was from AkzoNobel (VERSA TL 130, MW of 200,000 g/mol), and poly(diallyldimethylammonium chloride) from Ondeo-Nalco (SD 46104, with MW of 410,000 g/mol). Sodium chloride (Aldrich) was used to adjust solution ionic strength. Deionized water (Barnstead, E-pure, Milli-Q) was used to prepare all solutions.

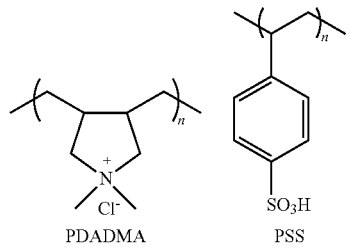

Solutions of PSS and PDADMA were prepared at a concentration of 0.125M with respect to their monomer units, neutralized to pH 7 with NaOH and their ionic strength adjusted (usually to 0.25M NaCl). Typically, to prepare the starting polyelectrolyte complex, 1 L of each was poured simultaneously into a 3 L beaker. 1 L of 0.25 M NaCl, used to rinse the flasks, was added to the precipitate. The mixture was stirred with a magnetic stirrer for about 30 min and the precipitated polyelectrolyte complex was decanted and washed with 1 L of 1M NaCl. The polyelectrolyte complex was chopped into pieces between 5 mm and 10 mm large then soaked in 1.0 M NaCl for 24 hr. The salt solution was strained off and excess liquid removed from the polyelectrolyte complex pieces by rapid dabbing with a paper towel.

To determine the salt content of the polyelectrolyte complexes, thermogravimetric analysis (TGA) was performed with a SDT Q600 TGA from TA Instruments. Prior to thermal analysis, samples were dried for 24 h at 90° C. in vacuo and gently ground.

Example 2

Stoichiometry of Starting Polyelectrolyte Complexes

Proton NMR spectroscopy (Bruker Advance 600 MHz spectrometer) was used to measure the ratio of PSS to PDADMAC in the polyelectrolyte complexes as follows: excess solution was removed from a piece of complex (50-100 mg) using paper wipes. To exchange most of the hydration $H_2O$ with $D_2O$ the complex was rinsed with 2.5 M NaCl in $D_2O$ (in three 1 mL aliquots over 24 h). The piece of complex was then dissolved in 1 mL 2.5 M KBr in $D_2O$. For calibration, spectra of mixtures of known amounts of PSS and PDADMAC in 2.5 M KBr were recorded under the same conditions. Then the precipitates were redissolved in 2.5 M NaBr in $D_2O$. In the solution 1H NMR spectra of these dissolved complexes, all the protons from the constituent polyelectrolytes were present. Integration of the signal of the four aromatic hydrogens of PSS (between 5.5 and 9 ppm) provided a convenient internal standard for comparison with the 16 aliphatic 1H (between 0 and 4.6 ppm) on PDADMA plus the three aliphatic 1H on PSS. The ratio PSS:PDADMA charged polyelectrolyte repeat units was 1:1, within an experimental error of +/−2%.

Example 3

Polyelectrolyte Complex Water Content

Figure 2:
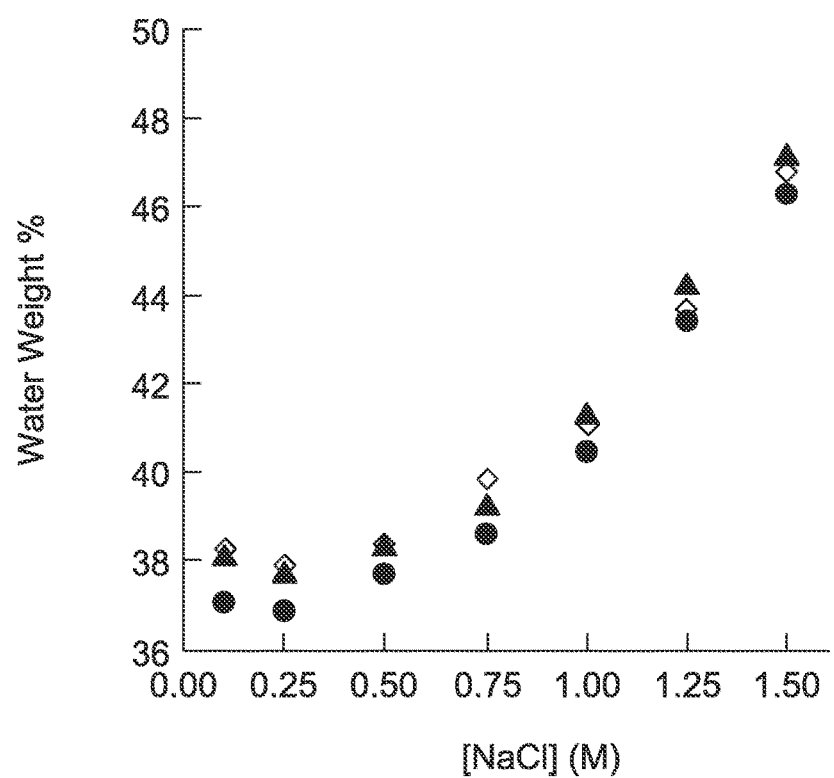
FIG. 2 is a graph of room temperature water content vs. salt concentration for PSS/PDADMA polyelectrolyte complexes after hydration for 2 days in salt solutions. The data is shown for polyelectrolyte complex extruded (•), double extruded (◇), and triple extruded (▲).

Starting polyelectrolyte complex was subjected to one, two, or three extrusions through a Model LE-075 Laboratory extruder with 1M NaCl. Polyelectrolyte complex was extruded as rod of about 1 mm diameter. Following extrusion, the doping level was set by immersing the article in a salt solution of specific NaCl concentration for 2 days. Excess salt solution was wiped off the articles and weighed. The samples were dried in an oven at 90° C. for 4 h and reweighed. The weight loss was the water content in weight %. FIG. 2 is a graph of room temperature water content vs. salt concentration for PSS/PDADMA polyelectrolyte complexes after hydration for 2 days in salt solutions. The data is shown for polyelectrolyte complex extruded (•), polyelectrolyte complex double extruded (◊), and polyelectrolyte complex triple extruded (▲).

Example 4

Doping of PSS/PDADMA with Different Salts

Figure 3:
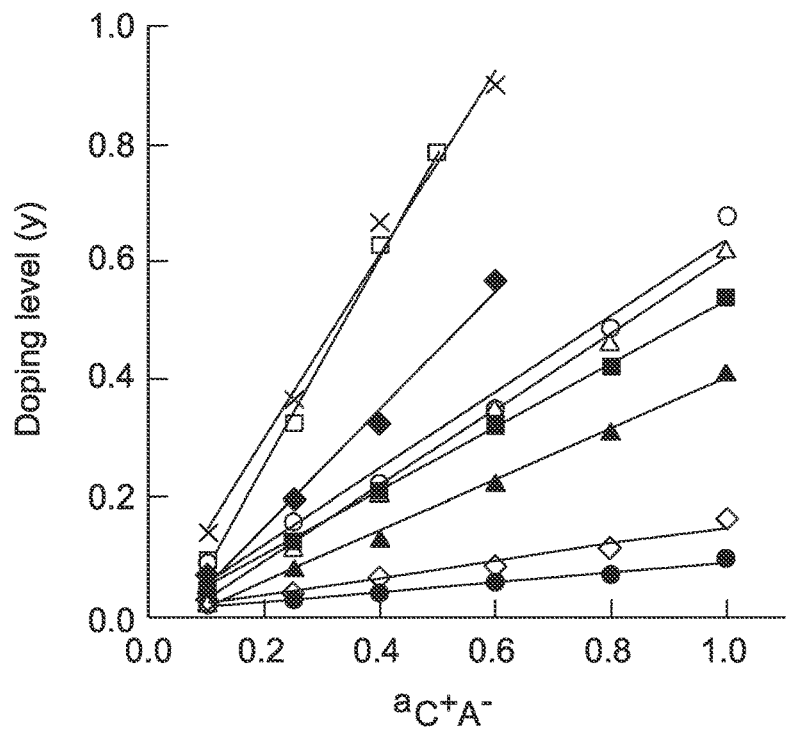
FIG. 3 is a graph depicting Doping level, y, in PSS/PDADMA extruded polyelectrolyte complex versus salt activity for NaF (•); NaCH₃COO (◇); NaClO₃ (▲); NaCl (■); NaNO₃ (△) NaBr (○); NaI (♦); NaClO₄ (×); and NaSCN (□). Room temperature.

A conductivity meter, equipped with a water jacket and temperature controlled to 25° C.±0.1° C., was standardized with NaCl solutions. After two consecutive extrusions, the stoichiometric (1:1 PSS:PDADMA) extruded polyelectrolyte complex, exPECs, from the Example above were annealed in 1.5 M NaCl for 24 h, then soaked in excess water to remove all ions. The extruded polyelectrolyte complex rods were cut into samples approximately 1 cm long, dabbed dry with a paper wipe and immersed separately into solutions of various salts at different concentrations. Each sample was allowed to dope to equilibrium at room temperature (23° C.±2° C.) for at least 24 h. Polyelectrolyte complexes were wiped then dropped into 50 mL water in the conductivity cell equipped with a small stir bar. Conductivity values were recorded every 30 s for 90 min and sent to a computer. After release of salt, extruded polyelectrolyte complexes were dried at 110° C. for 6 h to obtain the dry mass of the complex. All salt released was assumed to be doping the polymer. FIG. 3 is a graph depicting doping level as a function of salt concentration in the doping solution. FIG. 3 is a graph depicting Doping level, y, in PSS/PDADMA extruded polyelectrolyte complex versus salt activity for NaF (•); $NaCH_3COO$ (◊); $NaClO_3$ (▲); NaCl (■); NaNO₃ (Δ) NaBr (○); NaI (♦); NaClO₄ (×); and NaSCN (□). Room temperature.

This method is reliable for doping levels up to about 0.3 only. At doping levels higher than about 0.3 additional salt not paired with charged polyelectrolyte repeat units enters the complex. Hence, doping levels higher than 0.3 in FIG. 3 are only approximate.

Example 5

Equilibrium Modulus

Figure 4:
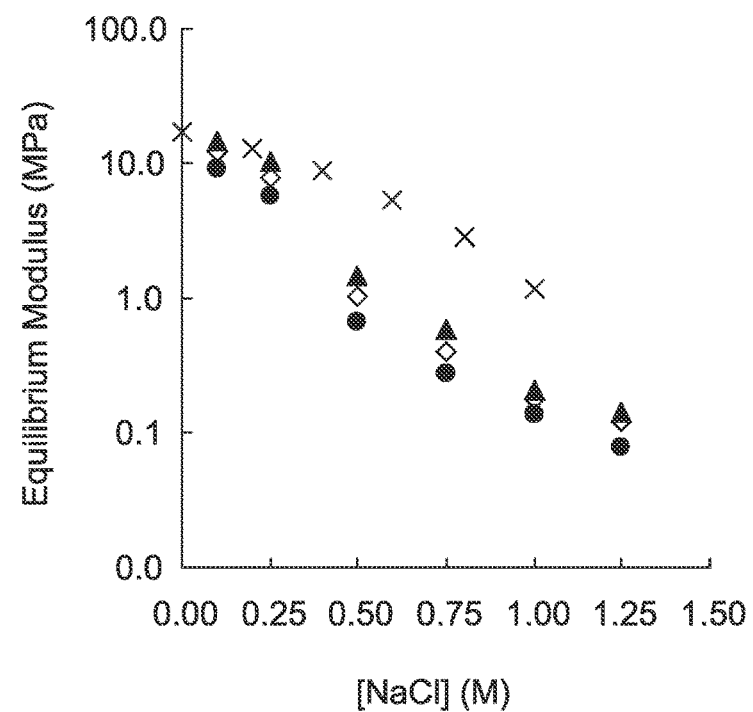
FIG. 4 is a graph of equilibrium modulus at different salt solutions for PSS/PDADMA samples extruded (•), double extruded (◇), and triple extruded (▲) at strain of 2% and speed of 10 mm/min.
Figure 5A:
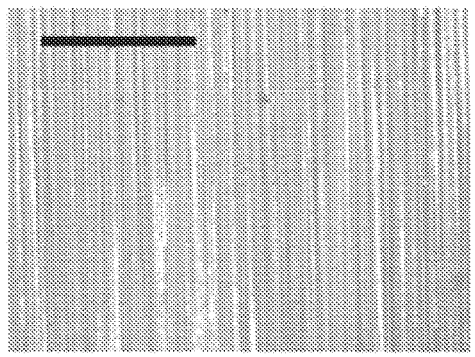
FIG. 5 are pictures of extruded starting polyelectrolyte complex with salt. Images of an extruded polyelectrolyte complex tape (A), an extruded polyelectrolyte complex rod (B), extruded polyelectrolyte complex tube (C) and its cross-section (D). Scale bar is 0.5 mm.
Figure 5B:
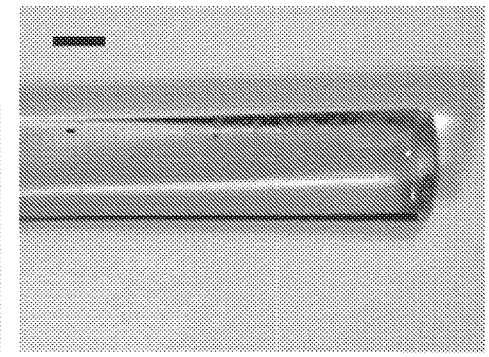
Figure 5C:
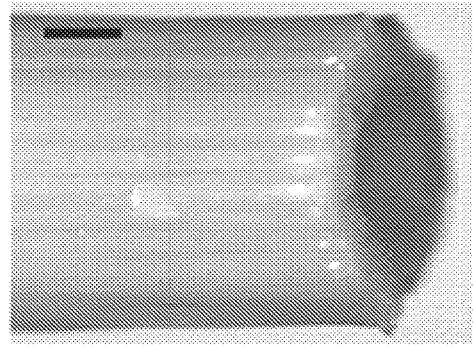
Figure 5D:
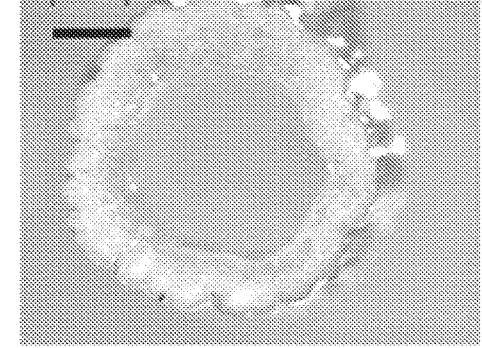

The relationship between applied strain and resulting stress in starting polyelectrolyte complex for strains of <2% (i.e., percent of elongation less than 2% of length of polyelectrolyte complex at rest) was found to be linear. Further, when the elongation cycle was repeated at a certain ionic strength, with a strain of less than 2%, stress/strain behavior was reproducible with minimal hysteresis. This means that the polyelectrolyte complex recovered almost completely when the applied stress is removed (i.e., there was no residual deformation). These measurements covered a range of salt concentrations. FIG. 4 is a graph of equilibrium modulus at different salt solutions for PSS/PDADMA samples extruded (•), double extruded (◇), and triple extruded (▲) at strain of 2% and speed of 10 mm/min. The points (×) are the modulus for PEMU of PDADMA/PSS recorded by Jaber et al. reference.

Example 6

Extrusion of Different Shapes

Starting polyelectrolyte was equilibrated with 1M NaCl and extruded as in the example above. The exit orifice had the geometry of tape, rod, and tube. See FIG. 5, which are pictures of extruded starting polyelectrolyte complex with salt. Images of an extruded polyelectrolyte complex tape (A), an extruded polyelectrolyte complex rod (B), extruded polyelectrolyte complex tube (C) and its cross-section (D). Scale bar is 0.5 mm.

Example 7

Doping at a Low Salt Concentration

Figure 6:
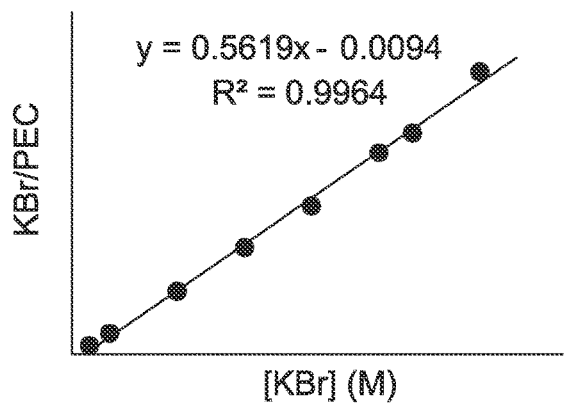
FIG. 6 is a graph of temperature doping level as a function of [KBr] for doping a PSS/PDADMA starting polyelectrolyte complex.

Samples of the starting complex of PSS/PDADMA were doped with KBr solutions of increasing concentration and allowed to equilibrate. The samples of doped polyelectrolyte complex were removed from the KBr solution, dabbed dry, then immersed in pure water to release the salt. The amount of salt released was determined with electrical conductivity as in Example 4. See FIG. 6, which is a graph of temperature doping level as a function of [KBr] for doping a PSS/PDADMA starting polyelectrolyte complex. At low doping, the doping level is also the molar ratio of KBr in the polyelectrolyte complex to polyelectrolyte complex repeat units (defined as one PSS/PDADMA ion pair), or KBr/polyelectrolyte complex (KBr/PEC). In this example, the linear relationship is KBr/PEC=doping level=0.5619x−0.0094 ($r^2$=0.9964). At about 1.8M KBr doping level reaches 1.00.

Example 8

Doping at High Salt Concentration

Figure 7:
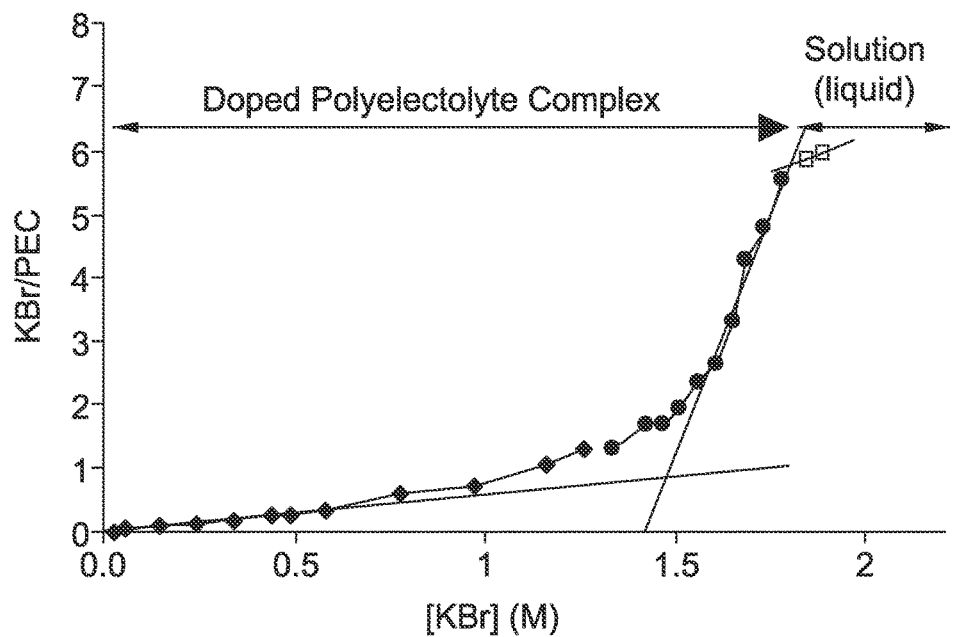
FIG. 7 is a graph showing the molar ratio of KBr to PSS/PDADMA polyelectrolyte complex in doped complex to 1.90M KBr at room temperature.

A sample of starting polyelectrolyte complex of stoichiometric PDADMA/PSS was exposed to increasing concentrations of aqueous KBr solution and the molar ratio of KBr to polyelectrolyte in the complex was measured by conductivity, as described in the previous example. FIG. 7 is a graph showing the ratio of moles KBr in the salt-doped complex to the moles of the dry PSS/PDADMA starting polyelectrolyte added. FIG. 7 is a graph showing the molar ratio of KBr to PSS/PDADMA polyelectrolyte complex in doped complex to 1.90M KBr at room temperature. At about 1.8M KBr the doping level reaches 1.00 and beyond this concentration of KBr the complex is dissolved and the polyelectrolyte molecules no longer associate with each other via ion pairing. Dotted line shows doping level, y, as a function of KBr concentration.

This Example illustrates the wide range of salt content found in a polyelectrolyte complex (PEC) in response to increasing salt solution concentration. At doping levels higher than about 0.35 the ratio KBr/PEC is no longer equal to the doping level because extra KBr, not associated with polyelectrolyte ion pairs, enters the complex. The actual doping level may be found by extrapolating the KBr/PEC values from the previous Example, said extrapolation shown in the dotted line in FIG. 7. When reading this extrapolation, projection back to the x-axis gives the doping level. When [KBr] reaches about 1.8M the doping level reaches 1.00.

Example 9

Identifying the Doping Level Less Than 1.00 Range Visually

Figure 8:
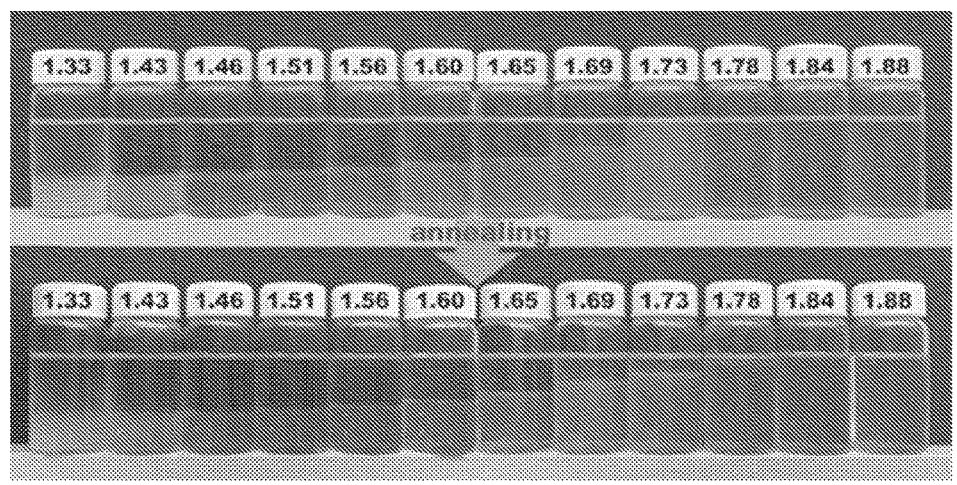
FIG. 8 are photos of (a) as-prepared doped PSS/PDADMA samples and (b) the samples 10 days after annealing for about 3 h at 60° C. and cooled down to room temperature. The numbers in the image show the [KBr] of each sample.

FIG. 8 are photos of (a) as-prepared doped PSS/PDADMA samples and (b) the samples 10 days after annealing for about 3 h at 60° C. and cooled down to room temperature. The numbers in the image show the [KBr] of each sample. The lower phase is rich in complex. When no phase separation is seen, here at about 1.8 M KBr, the doping level has reached 1.00.

FIG. 8 shows the samples from the previous Example. On increasing the concentration of salt, here KBr, the lower phase (polyelectrolyte complex, PEC) is doped. Phase separation is evident between the complex phase (higher concentration of polyelectrolyte) and the dilute phase above it (lower concentration of polyelectrolyte) up to the point where the doping level reaches 1.00. At this point there is no phase separation, no complex and the complex is dissolved/dissociated into individual polyelectrolytes.

Example 10

Viscosity of the Polyelectrolyte Complex Dope

Figure 9:
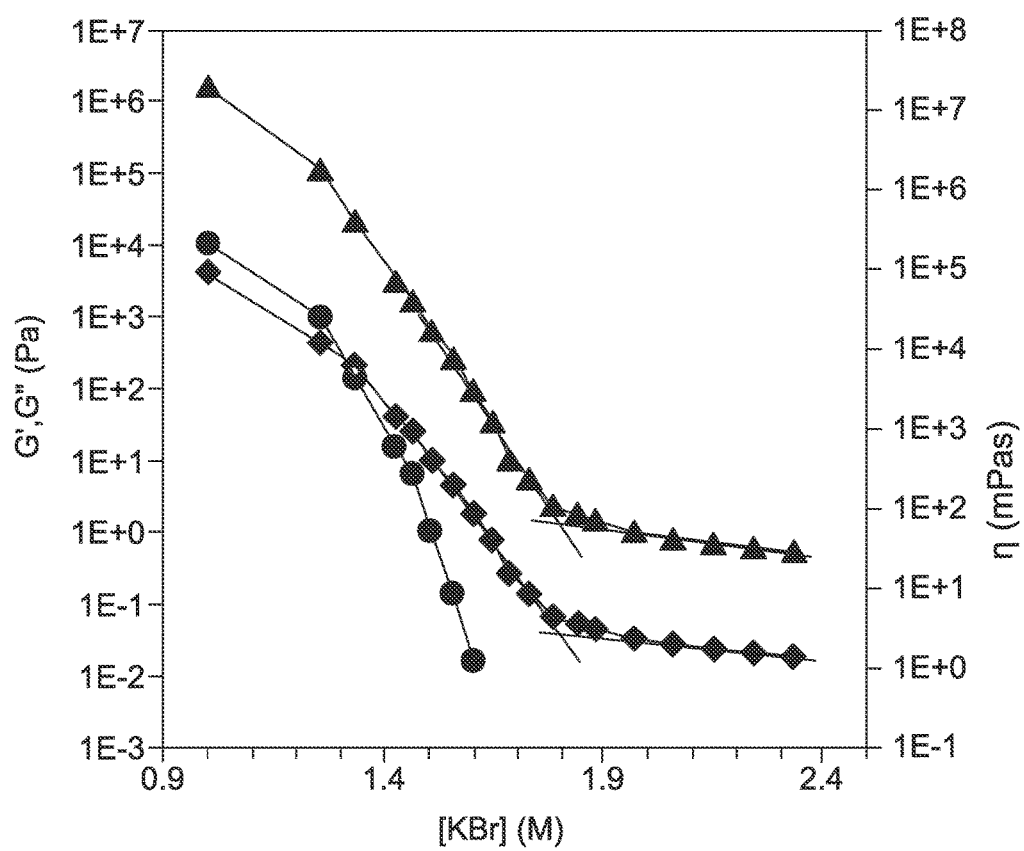
FIG. 9 is a graph of the dynamic modulus G' (•), G" (♦) and η (▲) at frequency of 0.1 Hz, shear stress of 25 Pa.

The loss modulus, storage modulus and viscosity of viscous polyelectrolyte complex dope in contact with aqueous KBr solutions was determined at room temperature using a parallel plate rheometer operating at a frequency of 0.1 Hz and a shear stress of 25 Pa. Three parameters are plotted in FIG. 9 as a function of KBr (salt) concentration: the storage modulus, G', the loss modulus, G" and the viscosity. FIG. 9 clearly shows how all parameters decrease dramatically with the addition of salt. The storage modulus represents an elastic component of the viscoelastic response of the polyelectrolyte complex dope. It is seen that the elastic modulus falls to unmeasureable values with sufficient salt. At a concentration of 1.8M KBr there is a sudden change in the slope of viscosity vs. [KBr] at the point where the doping level reaches 1.00 and the polyelectrolytes are dissolved (i.e. separated). At any point below 1.8M KBr the doping level is less than 1.00.

FIG. 9 is a graph of the dynamic modulus G' (•), G" (♦) and η (▲) at frequency of 0.1 Hz, shear stress of 25 Pa. 1 centipoise, cP=1 milliPascal second, mPas. The viscosity range in FIG. 9 suitable for the present invention is from about 100 to about 10E5 cP.

Example 11

Producing a Rough Coating of Polyelectrolyte Complex

Figure 10:
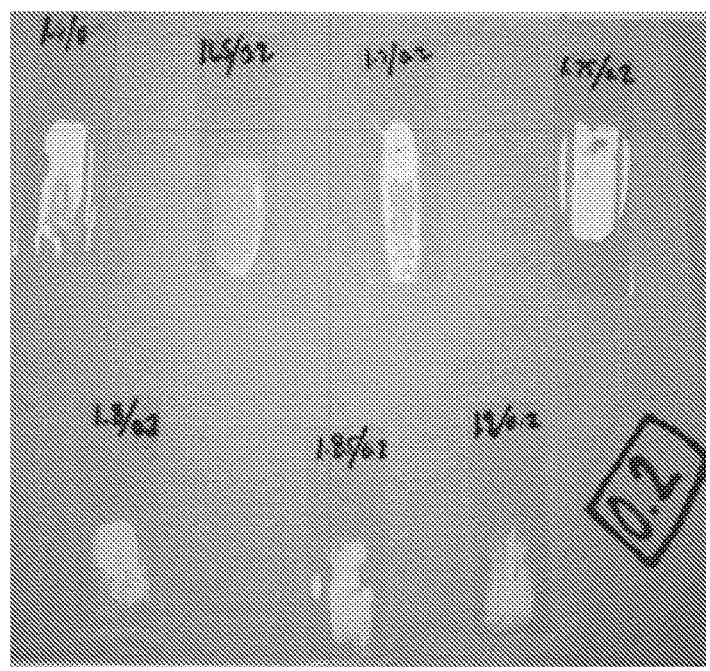
FIG. 10 is a photograph of a set of 1"×3" microscope slides coated with rough polyelectrolyte complex according to this invention.

Starting polyelectrolyte complex was doped with 1.8 KBr at room temperature to yield a fluid polyelectrolyte complex dope. The viscosity was about 500 cP and a phase separated region was seen above the complex, indicating doping of less than 1.00. The doping was estimated to be about 0.95. The dope was spread on 1"×3" microscope slides using steel bars defining a wet film thickness from 0.05 mm to 0.5 mm. The film was directly (without allowing to dry) immersed in a large volume of distilled water, whereupon the coated complex immediately turned white. The slide was removed from the water and dried with a gentle stream of nitrogen. FIG. 10 is a photograph showing that the dried complex coating the slides are white, indicating a rough, scattering surface. FIG. 10 is a photograph of a set of 1"×3" microscope slides coated with rough polyelectrolyte complex according to this invention. The thickness of the film of polyelectrolyte complex dope was 0.2 mm. White indicates roughness and scattering of the light.

Figure 11:
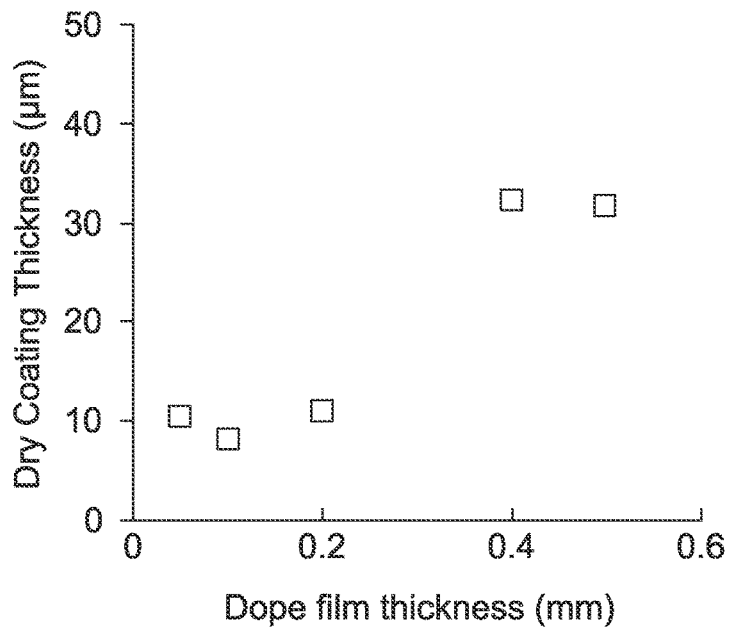
FIG. 11 is a graph showing the thickness of dry polyelectrolyte complex coating as a function of the thickness of polyelectrolyte complex dope applied to the surface of a microscope slide.
Figure 12:
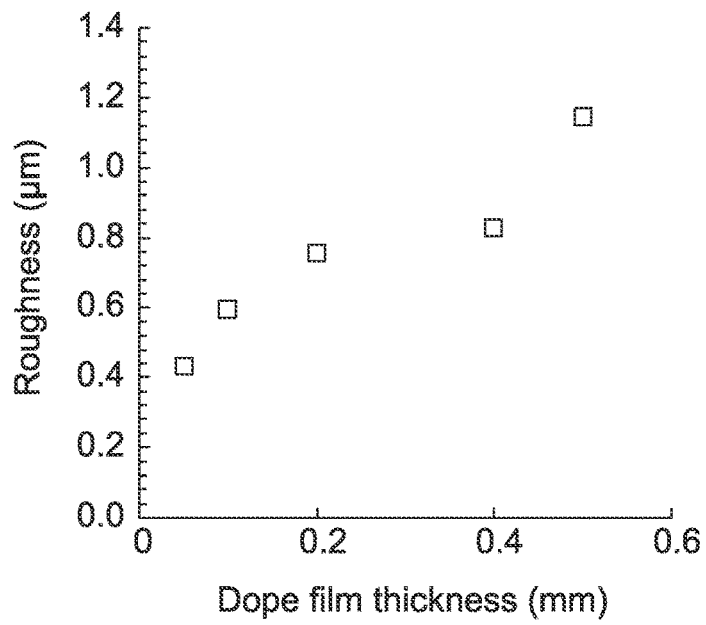
FIG. 12 is a graph showing the roughness of the surface of a dried polyelectrolyte complex film as a function of the polyelectrolyte complex dope thickness.

Surface RMS roughness values were obtained with a Tencor profilometer. Examples of surface roughnesses are provided in FIG. 11. FIG. 11 is a graph showing the thickness of dry polyelectrolyte complex coating as a function of the thickness of polyelectrolyte complex dope applied to the surface of a microscope slide. After coating the polyelectrolyte complex dope the slide was immersed in water to generate a rough film and the film was dried. Starting complex is doped in KBr solution and in equilibrium with 1.8M KBr. FIG. 12 is a graph showing the roughness of the surface of a dried polyelectrolyte complex film as a function of the PEC dope thickness. Conditions as in FIG. 11.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A process for preparing an article, the process comprising:
    depositing a polyelectrolyte complex dope on a substrate, wherein the polyelectrolyte complex dope comprises an interpenetrating blend of a positively charged polyelectrolyte and a negatively charged polyelectrolyte, and a salt and has a thickness of at least 10 micrometers and further wherein the polyelectrolyte complex dope has a doping level between 0.70 and 0.999 and a viscosity of greater than 10 cP; and
    rinsing the polyelectrolyte complex dope with an aqueous solution to remove the salt to an endpoint doping level of less than 0.5 and thereby form a polyelectrolyte complex coating having a surface roughness of at least 1 micrometer.

2. The process of claim 1 wherein the substrate is selected from the group consisting of metal, primed metal, wood, concrete, a plastic, polyethylene, polyurethane, silicone rubbers, polypropylene, polyvinylchloride, poly acrylates, polyethers, polycarbonates, polyamides, and polysulfones.

3. The process of claim 1 wherein the polyelectrolyte complex dope has a doping level between about between about 0.80 and about 0.999.

4. The process of claim 1 wherein the rinsing the polyelectrolyte complex dope results in an endpoint doping level is less than 0.2.

5. The process of claim 1 wherein polyelectrolyte complex dope has a thickness of at least about 100 micrometers and the polyelectrolyte complex coating has a surface roughness of at least 10 micrometers.

6. The process of claim 1 wherein the polyelectrolyte complex dope has a viscosity of greater than 100 cP.

7. The process of claim 1 wherein the polyelectrolyte complex coating comprises a first surface roughness having a first length scale and a second surface roughness having a second length scale, wherein the first length scale and the second length scale differ by more than a factor of about 2.

8. The process of claim 1 wherein the polyelectrolyte complex coating comprises a first surface roughness having a first length scale and a second surface roughness having a second length scale, wherein the first length scale and the second length scale differ by more than a factor of about 100.

* * * * *